(12) United States Patent
Yoshida et al.

(10) Patent No.: US 11,391,610 B2
(45) Date of Patent: Jul. 19, 2022

(54) FLOW RATE MEASUREMENT DEVICE

(71) Applicant: DENSO CORPORATION, Kariya (JP)

(72) Inventors: Yuusuke Yoshida, Nisshin (JP); Atsushi Honda, Nisshin (JP); Kazuaki Ueda, Nisshin (JP); Kengo Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/168,755

(22) Filed: Feb. 5, 2021

(65) Prior Publication Data

US 2021/0156722 A1     May 27, 2021

Related U.S. Application Data

(63) Continuation of application No. PCT/JP2019/026293, filed on Jul. 2, 2019.

(30) Foreign Application Priority Data

Aug. 8, 2018    (JP) .............................. JP2018-149049

(51) Int. Cl.
*G01F 1/69*     (2006.01)

(52) U.S. Cl.
CPC ...................... *G01F 1/69* (2013.01)

(58) Field of Classification Search
CPC ........... G01F 1/69; G01F 1/6842; G01F 1/684
See application file for complete search history.

(56) References Cited

U.S. PATENT DOCUMENTS

| | | | |
|---|---|---|---|
| 2005/0217357 A1 | 10/2005 | Lenzing et al. | |
| 2010/0000308 A1 | 1/2010 | Ariyoshi et al. | |
| 2011/0132101 A1 | 6/2011 | Ariyoshi et al. | |
| 2011/0138927 A1 | 6/2011 | Ariyoshi et al. | |
| 2013/0055800 A1 | 3/2013 | Kitahara et al. | |
| 2017/0276525 A1* | 9/2017 | Morino | G01F 1/684 |
| 2017/0276526 A1* | 9/2017 | Taniguchi | G01F 1/684 |
| 2018/0023983 A1 | 1/2018 | Watanabe et al. | |
| 2018/0306619 A1 | 10/2018 | Uenodan et al. | |
| 2019/0120674 A1 | 4/2019 | Morino et al. | |

(Continued)

FOREIGN PATENT DOCUMENTS

| | | | |
|---|---|---|---|
| CN | 107101798 A | * 8/2017 | ............... G01F 1/40 |
| JP | H6-307906 | 11/1994 | |
| JP | H11-014421 | 1/1999 | |

(Continued)

*Primary Examiner* — Francis C Gray
(74) *Attorney, Agent, or Firm* — Nixon & Vanderhye P.C.

(57) ABSTRACT

A flow rate measurement device includes a housing having a main flow path, a sub flow path formed inside the housing to allow a part of a fluid to be detected flowing through the main flow path, an inlet portion that allows the fluid to be measured flowing in the main flow path to flow into the sub flow path, an outlet portion that allows the fluid to be measured flowing in the sub flow path to flow out to the main flow path, a flow rate detection unit that is provided between the inlet portion and the outlet portion in the sub flow path and detects a flow rate of the fluid to be measured flowing through the sub flow path, and a communication hole that is provided between the flow rate detection unit and the outlet portion and communicates the sub flow path and the main flow path.

8 Claims, 26 Drawing Sheets

(56) References Cited

U.S. PATENT DOCUMENTS

2019/0383655 A1\* 12/2019 Kitahara .................. G01F 5/00

FOREIGN PATENT DOCUMENTS

| | | |
|---|---|---|
| JP | 2003-262546 | 9/2003 |
| JP | 2009-145162 | 7/2009 |
| JP | 2009145162 A \* | 7/2009 |
| JP | 2014-095619 | 5/2014 |
| JP | 2015-066348 | 4/2015 |
| JP | 2015-068793 | 4/2015 |
| JP | 2017-083317 | 5/2017 |

\* cited by examiner

FLOW RATE MEASUREMENT DEVICE

CROSS REFERENCE TO RELATED APPLICATIONS

This application is a continuation application of International Patent Application No. PCT/JP2019/026293 filed on Jul. 2, 2019, which designated the U.S. and based on and claims the benefits of priority of Japanese Patent Application No. 2018-149049 filed on Aug. 8, 2018. The entire disclosure of all of the above applications is incorporated herein by reference.

TECHNICAL FIELD

The present disclosure relates to a flow rate measurement device.

BACKGROUND

A flow rate measurement device includes a housing arranged in a main flow path and a sub flow path provided in the housing. The flow rate measurement device is a thermal flow meter that measures a flow rate of a fluid to be measured flowing in the main flow path.

SUMMARY

An object of the present disclosure is to provide a flow rate measurement device that detects the flow rate of the fluid to be measured with high accuracy.

The present disclosure can be realized as the following embodiments.

According to one aspect of the present disclosure, a flow rate measurement device is attached to a main flow path in a state of being inserted from outside of the main flow path in which a fluid to be measured flows and that measures a flow rate of the fluid to be measured in the main flow path. The flow rate measurement device includes a housing having a side surface extending in an insertion direction into a main flow path of the flow rate measurement device, a sub flow path formed inside the housing to allow a part of the fluid to be detected flowing through the main flow path, an inlet portion that is provided on the side surface and allows the fluid to be measured flowing in the main flow path to flow into the sub flow path, an outlet portion that allows the fluid to be measured flowing in the sub flow path to flow out to the main flow path, a flow rate detection unit that is provided between the inlet portion and the outlet portion in the sub flow path and detects a flow rate of the fluid to be measured flowing through the sub flow path, and a communication hole that is provided between the flow rate detection unit and the outlet portion of the sub flow path and communicates the sub flow path and the main flow path.

DESCRIPTION OF EMBODIMENT

Figure 1:
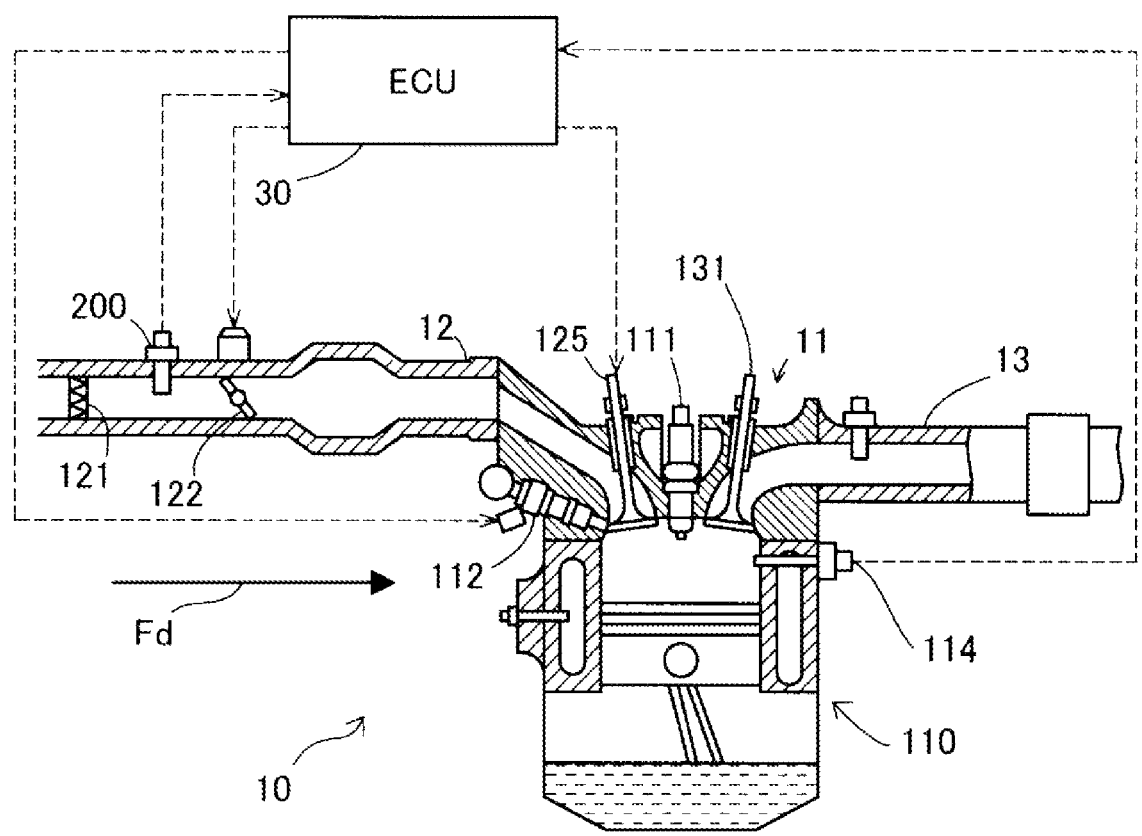
FIG. 1 is a schematic view of a combustion system in which a flow rate measurement device according to a first embodiment is used.

In an assumable example, a flow rate measurement device includes a housing arranged in a main flow path and a sub flow path provided in the housing. The flow rate measurement device is a thermal flow meter that measures a flow rate of a fluid to be measured flowing in the main flow path. In this flow rate measurement device, a drain hole for discharging water droplets flowing into the sub flow path is provided on an upstream side of a flow rate detection unit in the sub flow path.

In the above flow rate measurement device, when a backflow of the fluid to be measured occurs, there is a possibility that water droplets flow into the sub flow path from an outlet at a time of forward flow. When water droplets flow in from the outlet, they may reach the flow rate detection unit before the water droplets are discharged from the drain hole. Therefore, water droplets may adhere to the flow rate detection unit. If water droplets adhere to the flow rate detection unit, the accuracy of flow rate detection by the flow rate detection unit may decrease.

The present disclosure can be realized as the following embodiments.

According to one aspect of the present disclosure, a flow rate measurement device is attached to a main flow path in a state of being inserted from outside of the main flow path in which the fluid to be measured flows and that measures a flow rate of the fluid to be measured in the main flow path. A flow rate measurement device includes a housing having a side surface extending in an insertion direction into a main flow path of the flow rate measurement device, a sub flow path formed inside the housing to allow a part of the fluid to be detected flowing through the main flow path, an inlet portion that is provided on the side surface and allows the fluid to be measured flowing in the main flow path to flow into the sub flow path, an outlet portion that allows the fluid to be measured flowing in the sub flow path to flow out to the main flow path, a flow rate detection unit that is provided between the inlet portion and the outlet portion in the sub flow path and detects a flow rate of the fluid to be measured flowing through the sub flow path, and a communication hole provided between the flow rate detection unit and the outlet portion of the sub flow path and communicating the sub flow path and the main flow path.

According to the above embodiment, the flow rate measurement device is provided between the flow rate detection unit and the outlet portion of the sub flow path, and includes a communication hole for communicating the sub flow path and the main flow path. Therefore, even when the fluid to be measured containing water droplets flows into the sub flow path from the outlet portion, the flowing fluid to be measured can be discharged from the communication hole provided on the outlet portion side of the flow rate detection unit. Therefore, the possibility of water droplets adhering to the flow rate detection unit is reduced. Therefore, the reduction in the flow rate detection accuracy in the flow rate measurement device due to the adhesion of water droplets to the flow rate detecting unit is suppressed.

A. First Embodiment

As shown in FIG. 1, a flow rate measurement device 200 according to the embodiment is used in a combustion system 10 including an internal combustion engine 11. The combustion system 10 includes the internal combustion engine 11, a main flow path 12 and an exhaust flow path 13 formed by piping, and an ECU 30. The combustion system 10 is mounted on, for example, a vehicle with a gasoline engine and used as a drive device.

The internal combustion engine 11 includes a combustion chamber 110, a spark plug 111, a fuel injection valve 112, a combustion pressure sensor 114, an intake valve 125, and an exhaust valve 131. The internal combustion engine 11 generates power by burning a mixed gas of air supplied through the main flow path 12 and fuel injected from the fuel injection valve 112. The spark plug 111 causes spark discharge to ignite the mixed gas (mixed gas of fuel and air) in the combustion chamber 110. The fuel injection valve 112 injects fuel into the combustion chamber 110. The combustion pressure sensor 114 detects the combustion pressure in the combustion chamber 110.

The main flow path 12 and the exhaust flow path 13 are connected to the combustion chamber 110. The main flow path 12 is a flow path that guides air to the combustion chamber 110. The exhaust flow path 13 is a flow path for discharging the exhaust gas, which is a gas after being burned, from the combustion chamber 110.

The main flow path 12 is provided with an air cleaner 121, a flow rate measurement device 200, and a throttle valve 122 in order from an upstream side. The air cleaner 121 removes dust in the air flowing through the main flow path 12. The throttle valve 122 adjusts a flow path resistance in the main flow path 12 by adjusting its own opening degree. The flow rate measurement device 200 detects the flow rate of the intake air flowing through the main flow path 12. In FIG. 1, a flow direction Fd of the intake air in the forward flow state in which the intake air flows from the upstream side to the downstream side in the main flow path 12 is indicated by an arrow.

An ECU 30 is an arithmetic processing circuit including a storage medium such as a processor, a RAM, a ROM, and a flash memory, a microcomputer including an input/output unit, and a power supply circuit. The ECU 30 controls the opening degree of the throttle valve 122 and the fuel injection amount injected from the fuel injection valve 112 by using the detection results acquired from the flow rate measurement device 200 and various sensors such as the combustion pressure sensor 114.

Figure 2:
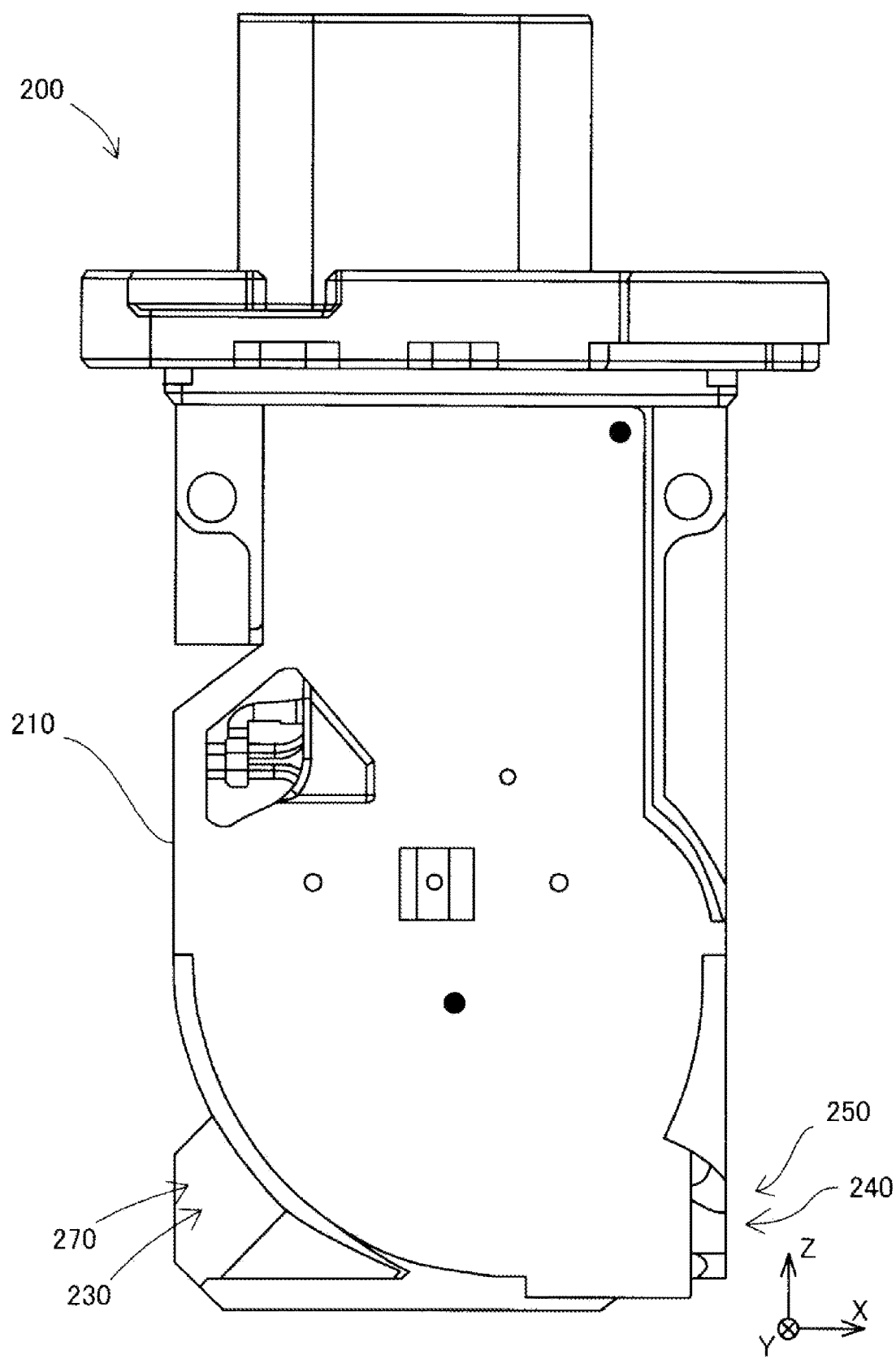
FIG. 2 is an external view of the flow rate measurement device when viewed from a direction orthogonal to an opening direction and an insertion direction of an inlet.
Figure 3:
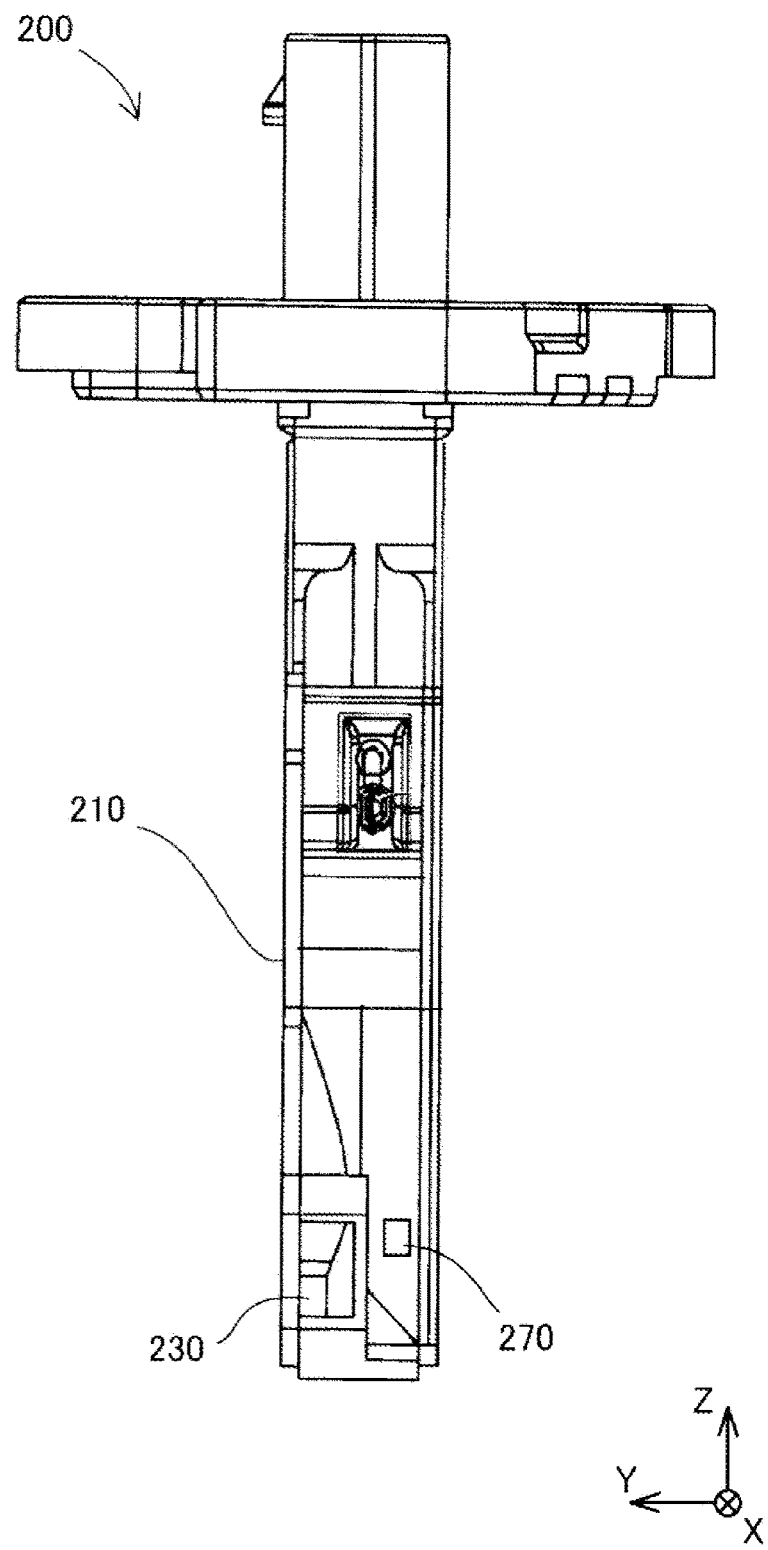
FIG. 3 is an external view of the flow rate measurement device when viewed from an inlet side.
Figure 4:
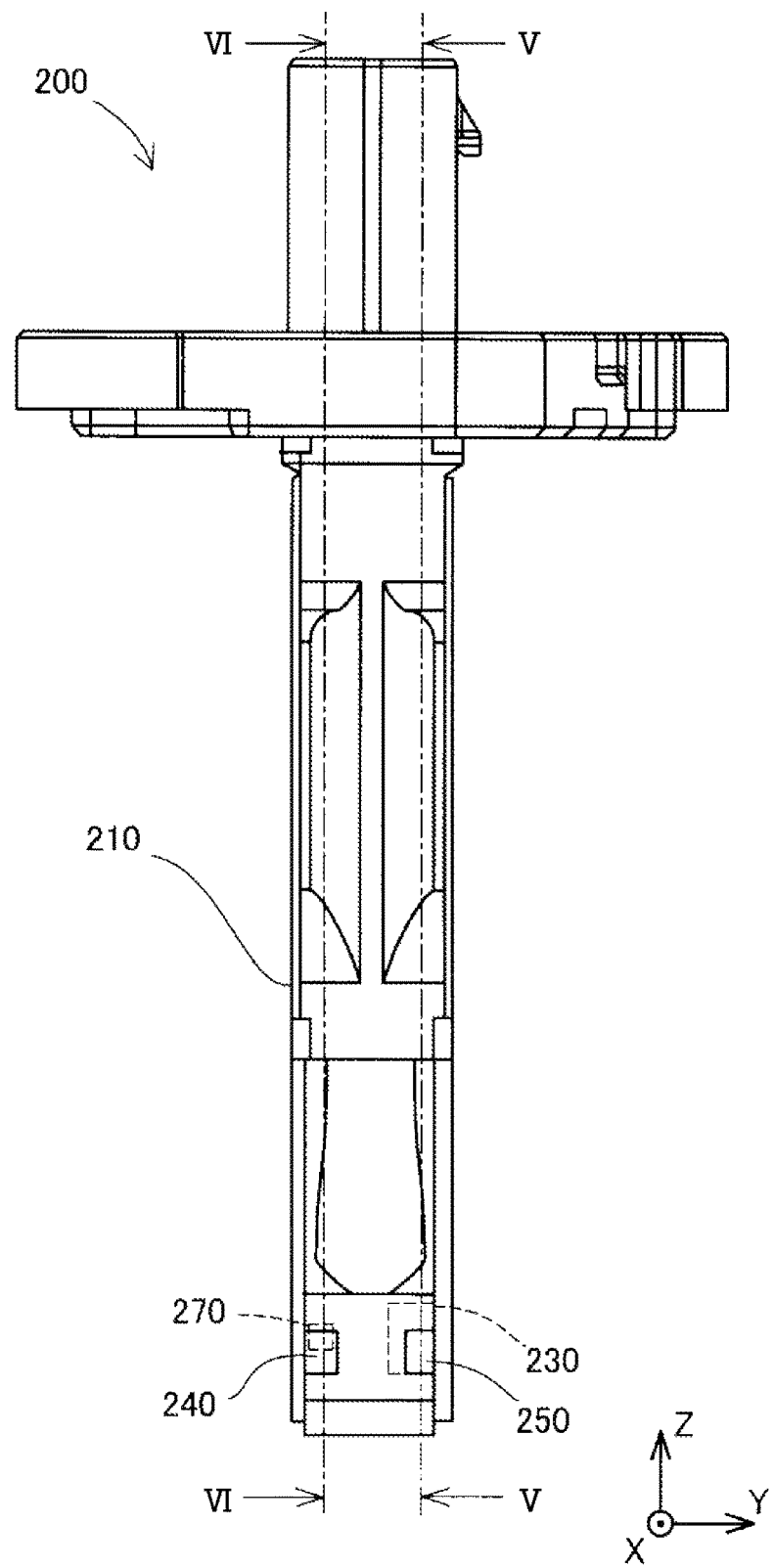
FIG. 4 is an external view of the flow rate measurement device when viewed from an outlet side.

As shown in FIGS. 2 to 4, the flow rate measurement device 200 includes a housing 210, an inlet portion 230, an outlet portion 240, a discharge port 250, and a communication hole 270. In FIG. 2, the Z-axis is the direction axis along an insertion direction when the flow rate measurement device 200 is attached to the main flow path 12. The X-axis is the direction axis along an opening direction of the inlet portion 230. The Y-axis is the direction axis orthogonal to the insertion direction and the opening direction of the inlet portion 230. The opening direction of the inlet portion 230 is the −X axis direction in FIG. 2. The insertion direction of the flow rate measurement device 200 is the −Z axis direction. The flow rate measurement device 200 is attached to the main flow path 12 so that the inlet portion 230 faces the upstream side of the main flow path 12. That is, when the flow rate measurement device 200 is attached to the main flow path 12, the +X-axis direction substantially coincides with the flow direction Fd in FIG. 1. Further, the −Z axis direction substantially coincides with the gravity direction when the flow rate measurement device 200 is attached to the main flow path 12. In the present embodiment, the outlet portion 240 is formed on a surface facing a side surface of the housing 210 on which the inlet portion 230 is provided. Further, in the present embodiment, the communication hole 270 is provided on the surface where the inlet portion 230 is provided.

Figure 5:
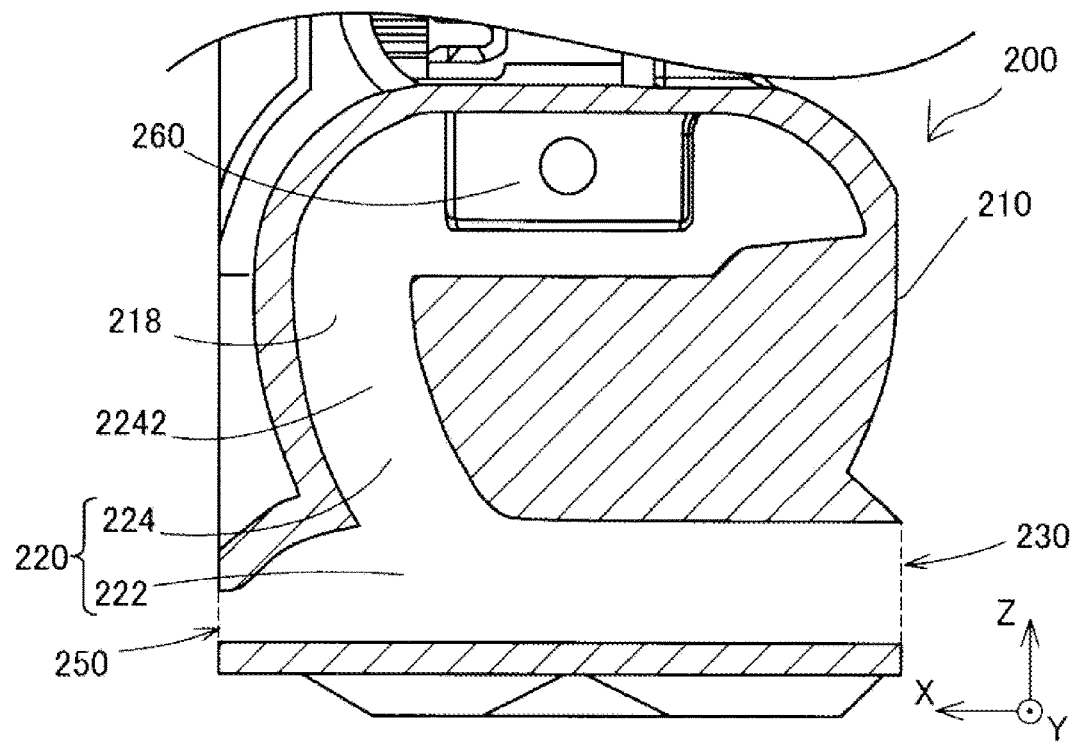
FIG. 5 is a schematic cross-sectional view of the flow rate measurement device along a V-V line shown in FIG. 4.
Figure 6:
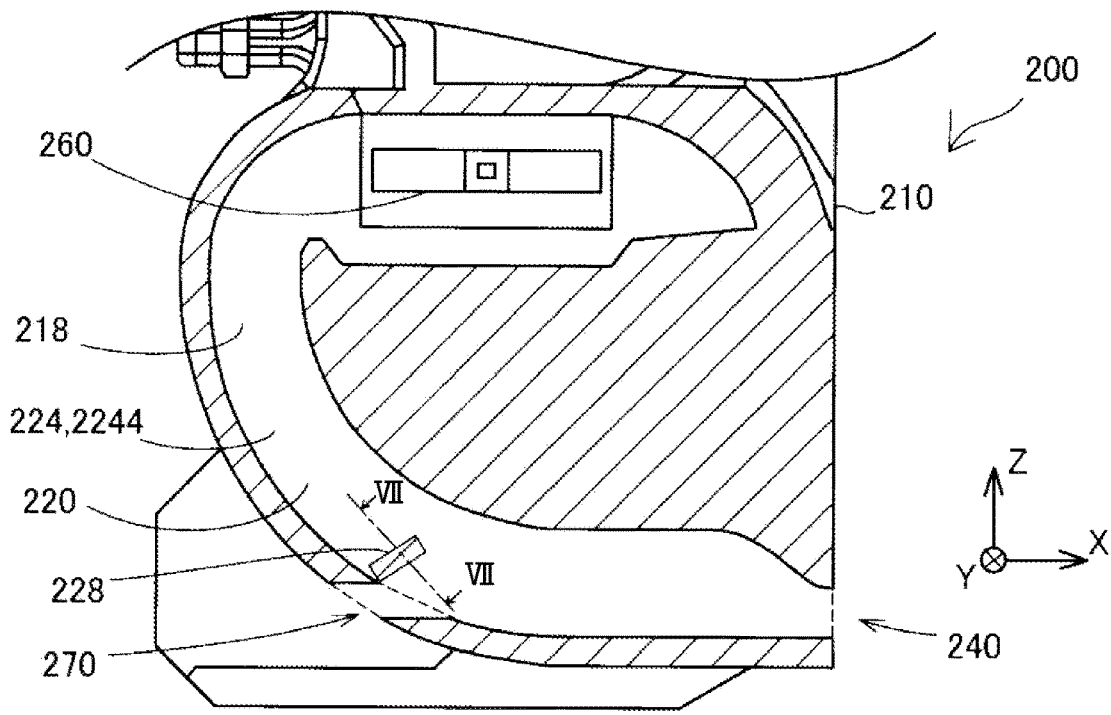
FIG. 6 is a schematic cross-sectional view of the flow rate measurement device along a VI-VI line shown in FIG. 4.

As shown in FIGS. 5 and 6, a sub flow path 220 is formed inside the flow rate measurement device 200. The housing 210 is a housing made of synthetic resin, and has a sub flow path forming portion that forms the sub flow path 220 therein, and a holding portion that holds the flow rate detection unit 260.

The sub flow path 220 is a passage through which a part of the intake air flowing through the main flow path 12 flows. As shown in FIG. 5, the sub flow path 220 includes a discharge flow path 222 from the inlet portion 230 to the discharge port 250 and a detection flow path 224 extending from the inlet portion 230 to the outlet portion 240 side as shown in FIG. 6. The detection flow path 224 has an upstream side detection flow path 2242 (see, FIG. 5) and a downstream side detection flow path 2244 (see, FIG. 6). The upstream side detection flow path 2242 is a section of the detection flow path 224 from the inlet portion 230 to the flow rate detection unit 260. The downstream side detection flow path 2244 is a section of the detection flow path 224 from the flow rate detection unit 260 to the outlet portion 240. The discharge flow path 222 and the upstream side detection flow path 2242 shown in FIG. 5 and the downstream side detection flow path 2244 shown in FIG. 6 are separated from each other by a sub flow path wall 218.

The flow rate detection unit 260 is provided in a middle of the sub flow path 220 and detects the flow rate of the fluid to be measured flowing through the sub flow path 220. The flow rate detection unit 260 is preferably capable of distinguishing whether the flow direction of the fluid to be measured is a forward flow direction or a backward flow direction. In the present embodiment, the flow rate detection unit 260 employs a temperature difference method, which is a method capable of distinguishing the flow directions. In the present embodiment, the flow rate detection unit 260 has a heater and a plurality of temperature sensors (not shown). The heater heats the fluid to be measured. The plurality of temperature sensors are arranged along the flow direction of the fluid to be measured, and each thereof acquires the temperature of the fluid to be measured. The flow rate detection unit 260 of the present embodiment detects the flow rate based on the temperature difference between the upstream side and the downstream side of the heater. The temperature sensor is arranged on both the upstream side and the downstream side of the heater. In the present embodiment, the temperature sensor is a temperature sensitive resistor and the heater is a heat generating resistor.

As shown in FIG. 6, the communication hole 270 is provided in the downstream side detection flow path 2244 of the sub flow path 220, that is, between the flow rate detection unit 260 and the outlet portion 240. As shown in FIG. 3, in the present embodiment, the communication hole 270 is provided on the same side surface as the side surface on which the inlet portion 230 is provided. Further, as shown in FIG. 4, the opening of the communication hole 270 indicated by the broken line overlaps with the opening of the outlet portion 240 when viewed from the outlet portion 240 side.

Figure 7:
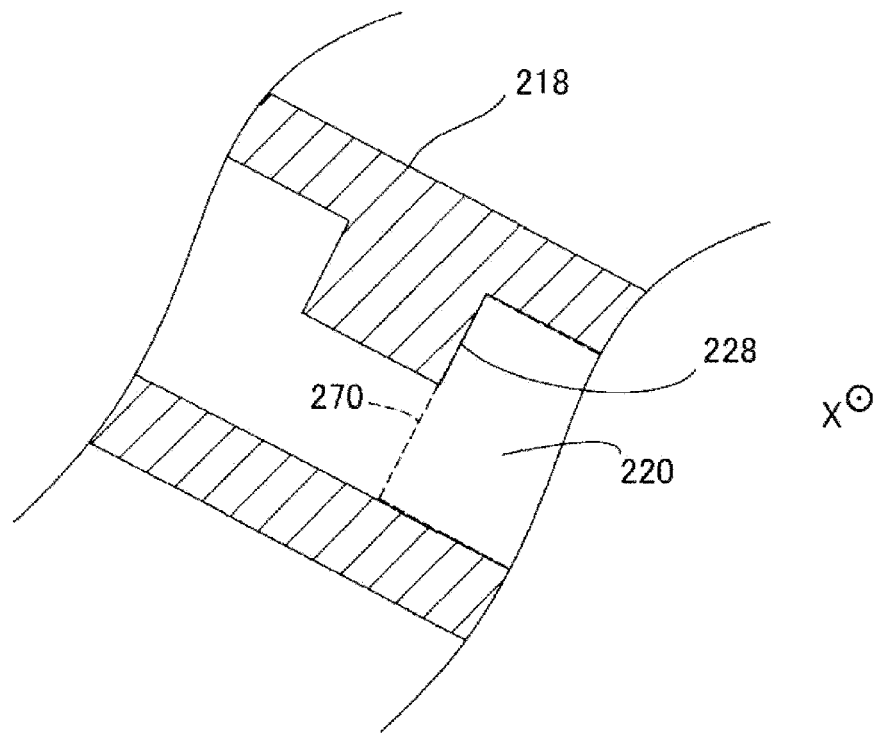
FIG. 7 is a schematic cross-sectional view of the flow rate measurement device along a VII-VII line shown in FIG. 6.

As shown in FIG. 6, a convex portion 228 is provided between the communication hole 270 and the flow rate detection unit 260 to reduce the flow path cross-sectional area of the sub flow path 220. In the present embodiment, the convex portion 228 is provided at a position adjacent to the communication hole 270. As shown in FIG. 7, the convex portion 228 in the present embodiment has a structure protruding inward from the downstream side detection flow path 2244 from the sub flow path wall 218, and is a stepped portion having a stepped shape. The stepped shape means a shape that discontinuously changes the flow path cross-sectional area of the sub flow path 220. The flow path cross-sectional area at the position where the convex portion 228 is provided is smaller than the flow path cross-sectional area at the position where the convex portion 228 is not provided.

In the following, the flow path of the intake air will be described with reference to FIGS. 5 and 6. A part of the intake air in the forward flow state flowing from the upstream side to the downstream side of the main flow path 12 (see, FIG. 1) flows into the inside of the flow rate measurement device 200 from the inlet portion 230 as the fluid to be measured. The fluid to be measured that has flowed in from the inlet portion 230 flows in the sub flow path 220. A part of the fluid to be measured flowing in the sub flow path 220 is discharged from the discharge port 250 provided on the upstream side of the sub flow path 220. As a result, an increase in pressure in the sub flow path 220 can be suppressed. Of the fluid to be measured flowing in the sub flow path 220, the fluid to be measured that is not discharged from the discharge port 250 passes through the flow rate detection unit 260 and then flows out from the outlet portion 240 to the main flow path 12. The fluid to be measured flowing out from the outlet portion 240 to the main flow path 12 joins the fluid to be measured flowing in the main flow path 12 without flowing into the flow rate measurement device 200, and is supplied to the internal combustion engine 11.

On the other hand, a part of the intake air in the backflow state flowing from the downstream side to the upstream side of the main flow path 12 flows into the inside of the flow rate measurement device 200 from the outlet portion 240 as the fluid to be measured. The fluid to be measured that has flowed in from the outlet portion 240 flows in the sub flow path 220. A part of the fluid to be measured flowing in the sub flow path 220 is discharged from the communication hole 270 provided on the downstream side of the sub flow path 220. As a result, an increase in pressure in the sub flow path 220 can be suppressed. Of the fluid to be measured flowing in the sub flow path 220, the fluid to be measured that is not discharged from the communication hole 270 passes through the flow rate detection unit 260 and then flows out from the inlet portion 230 to the main flow path 12. The fluid to be measured flowing out from the inlet portion 230 to the main flow path 12 joins the fluid to be measured flowing in the main flow path 12 without flowing into the flow rate measurement device 200, and flows to the upstream side of the main flow path 12. The backflow state occurs, for example, when an idling operation is executed in the combustion system 10. When the idling operation is executed, the combustion system 10 closes the intake valve 125 to stop the intake air from flowing into the internal combustion engine 11. In this case, the pressure of the intake air on the internal combustion engine 11 side of the main flow path 12 rises, the pressure on the downstream side of the main flow path 12 becomes higher than the pressure on the upstream side thereof, and the backflow occurs.

The intake air contains water such as water droplets and water vapor. Therefore, there is a possibility that water may flow into the sub flow path 220 together with the intake air as the fluid to be measured. In the following, the state when water flows into the sub flow path 220 in the forward flow state will be described with reference to FIG. 8.

Figure 8:
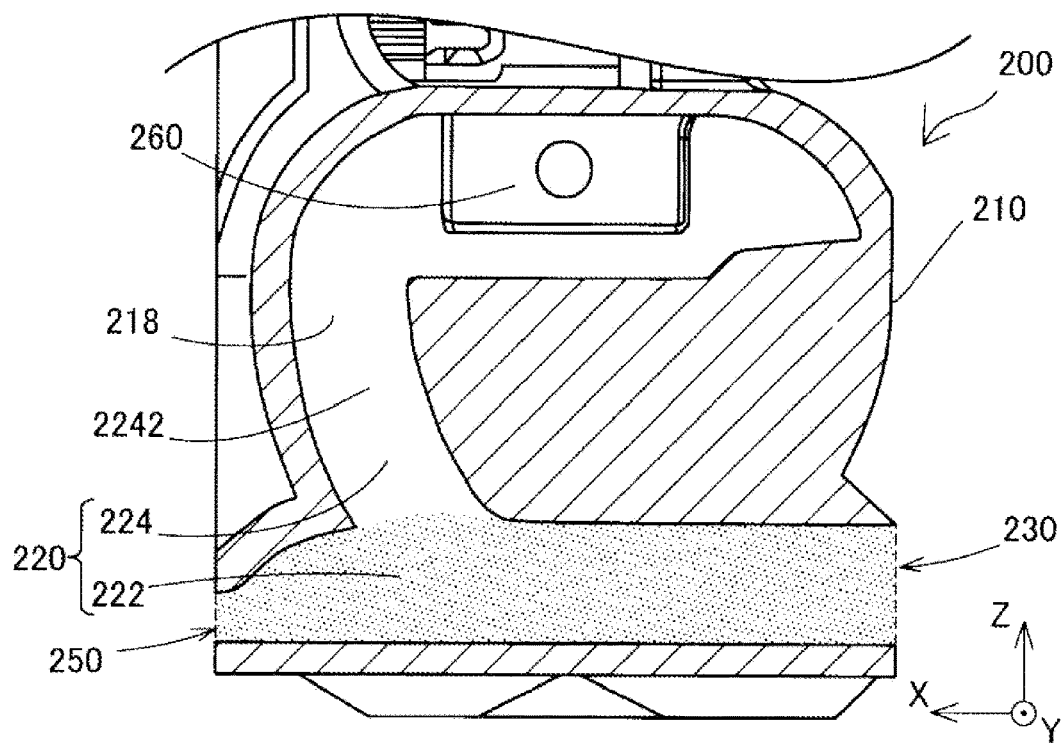
FIG. 8 is an explanatory diagram of a water flow path in a forward flow state in the first embodiment.

In FIG. 8, main path through which water, particularly heavy water droplets, flows in the sub flow path 220 is indicated by dots. As shown in FIG. 8, the water flowing in from the inlet portion 230 mainly flows out from the discharge port 250 to the main flow path 12. Since heavy water droplets tend to move in the −Z axis direction due to gravity, it is difficult for them to flow into the detection flow path 224 extending in the antigravity direction (+Z axis direction) where the flow rate detection unit 260 is arranged.

As shown in FIG. 4, when the flow rate measurement device 200 is viewed from the outlet portion 240 side, the discharge port 250 and the inlet portion 230 are formed so as to overlap each other. Therefore, the water flowing in from the inlet portion 230 smoothly moves to the discharge port 250. Further, an opening axis extending through a center of the opening of the discharge port 250 and extending along the X-axis direction overlaps with the opening of the inlet portion 230. In this case, the movement of water from the inlet portion 230 to the discharge port 250 becomes smoother.

Further, even in the case of the backflow state, there is a possibility that water may flow into the sub flow path 220 as in the case of the forward flow state. In the following, the state when water flows into the sub flow path 220 in the backflow state will be described with reference to FIG. 9.

Figure 9:
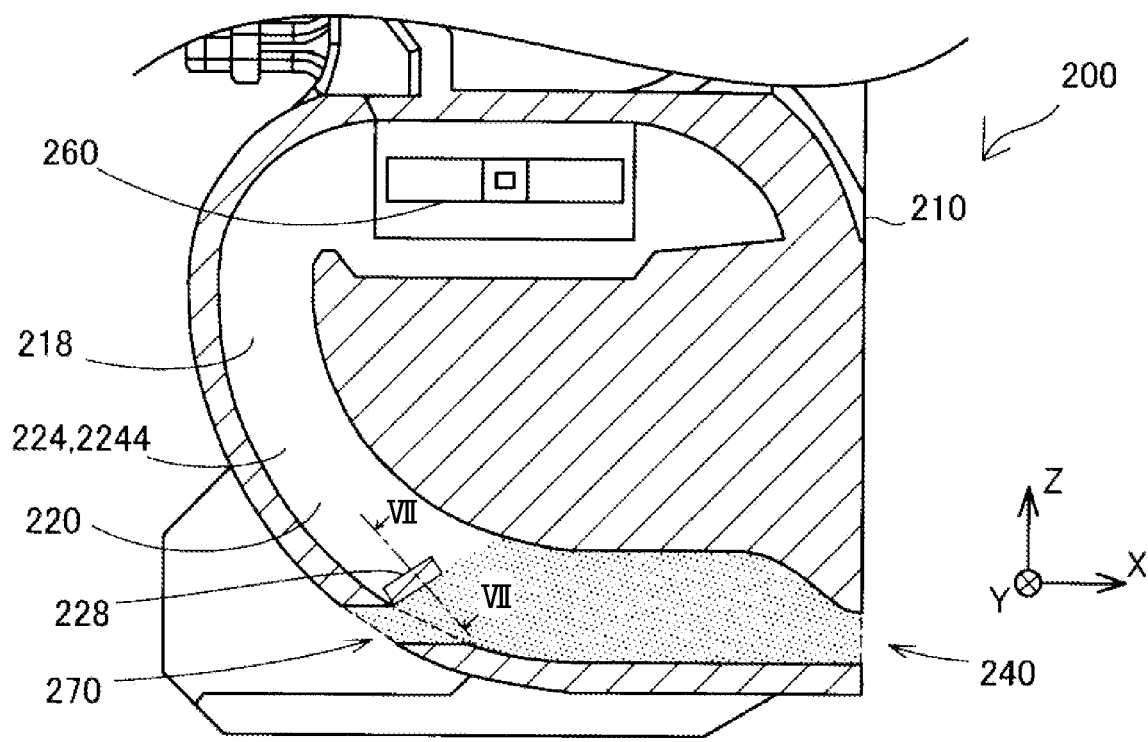
FIG. 9 is an explanatory diagram of a water flow path in a backflow state in the first embodiment.

Also in FIG. 9, as in FIG. 8, main path through which water, particularly heavy water droplets, flows in the sub flow path 220 is indicated by dots. As shown in FIG. 9, the water flowing in from the outlet portion 240 mainly flows out from the communication hole 270 to the main flow path 12. Since heavy water droplets tend to move in the −Z axis direction due to gravity, so that it is difficult for them to flow above the communication hole 270 of the detection flow path 224 (in the +Z axis direction). Further, in the present embodiment, the flow path cross-sectional area of the region between the communication hole 270 and the flow rate detection unit 260 where the convex portion 228 is provided is smaller than the flow path cross-sectional area of the other region. Therefore, the flow path resistance between the communication hole 270 and the flow rate detection unit 260 is larger than the flow path resistance between the communication hole 270 and the outlet portion 240. As a result, the inflow of water above the communication hole 270 of the detection flow path 224 (in the +Z axis direction) is further suppressed.

As shown in FIG. 4, when the flow rate measurement device 200 is viewed from the outlet portion 240 side, the communication hole 270 and the outlet portion 240 are formed so as to overlap each other. Therefore, the water flowing in from the outlet portion 240 smoothly moves to the communication hole 270. Further, an opening axis extending along the X-axis direction through the center of the opening of the communication hole 270 overlaps with the opening of the outlet portion 240. In this case, the movement of water from the outlet portion 240 to the communication hole 270 becomes smoother.

Further, when the intake air is flowing backward, the communication hole 270 is provided on the surface opposite to the side surface on which the outlet portion 240 is provided. The outlet portion 240 faces the flow direction of the intake air in the backflow state. Therefore, the pressure outside the flow rate measurement device 200 through the communication hole 270 is smaller than the pressure outside the flow rate measurement device 200 through the outlet portion 240. As a result, the movement of water from the outlet portion 240 to the communication hole 270 becomes smoother.

According to the flow rate measurement device 200 according to the first embodiment described above, the communication hole 270 is provided between the flow rate detection unit 260 and the outlet portion 240 of the sub flow path 220 so as to communicate the sub flow path 220 with the main flow path 12. Therefore, in the flow rate measurement device 200, even when the fluid to be measured containing water droplets flows into the sub flow path 220 from the outlet portion 240 due to the backflow, the flowing fluid to be measured can be discharged from the communication hole 270 provided on the outlet portion 240 side with respect to the flow rate detection unit 260. Therefore, the possibility of water droplets adhering to the flow rate detection unit 260 is reduced. Therefore, the decrease in the measurement accuracy of the flow rate in the flow rate measurement device 200 due to the adhesion of water droplets to the flow rate detection unit 260 is suppressed.

Further, according to the flow rate measurement device 200 according to the first embodiment described above, the flow path cross-sectional area of the sub flow path 220 in at least a part between the flow rate detection unit 260 and the communication hole 270 is smaller than the flow path cross-sectional area in the sub flow path 220 between the communication hole 270 and the outlet portion 240. Therefore, the flow path resistance in the region between the flow rate detection unit 260 and the communication hole 270 of the sub flow path 220 is larger than the flow path resistance in the region between the communication hole 270 and the outlet portion 240. Therefore, the inflow of the water flowing from the outlet portion 240 to the flow rate detection unit 260 side is suppressed. Further, a convex portion 228, which is a stepped portion, is provided between the flow rate detection unit 260 and the communication hole 270. Therefore, the water flowing in from the outlet portion 240 side collides with the convex portion 228. Therefore, the flow rate measurement device 200 can more efficiently suppress the inflow of water from the convex portion 228 to the flow rate detection unit 260 side at the time of backflow.

Further, according to the flow rate measurement device 200 according to the first embodiment described above, the convex portion 228 is provided on the communication hole 270 side of the section between the communication hole 270 and the flow rate detection unit 260. Therefore, at the time of backflow, the flow rate measurement device 200 can efficiently discharge the water suppressed from flowing into the flow rate detection unit 260 from the communication hole 270 due to the convex portion 228. Further, in the present embodiment, since the convex portion 228 is provided at a position adjacent to the communication hole 270, water can be discharged more efficiently.

B. Second Embodiment

The flow rate measurement device 400 according to a second embodiment has a different structure of the flow measurement device 200 according to the first embodiment and a housing 410. In the following, when the same configuration as that of the first embodiment is described, the same reference numerals are given and detailed description thereof will be omitted.

Figure 10:
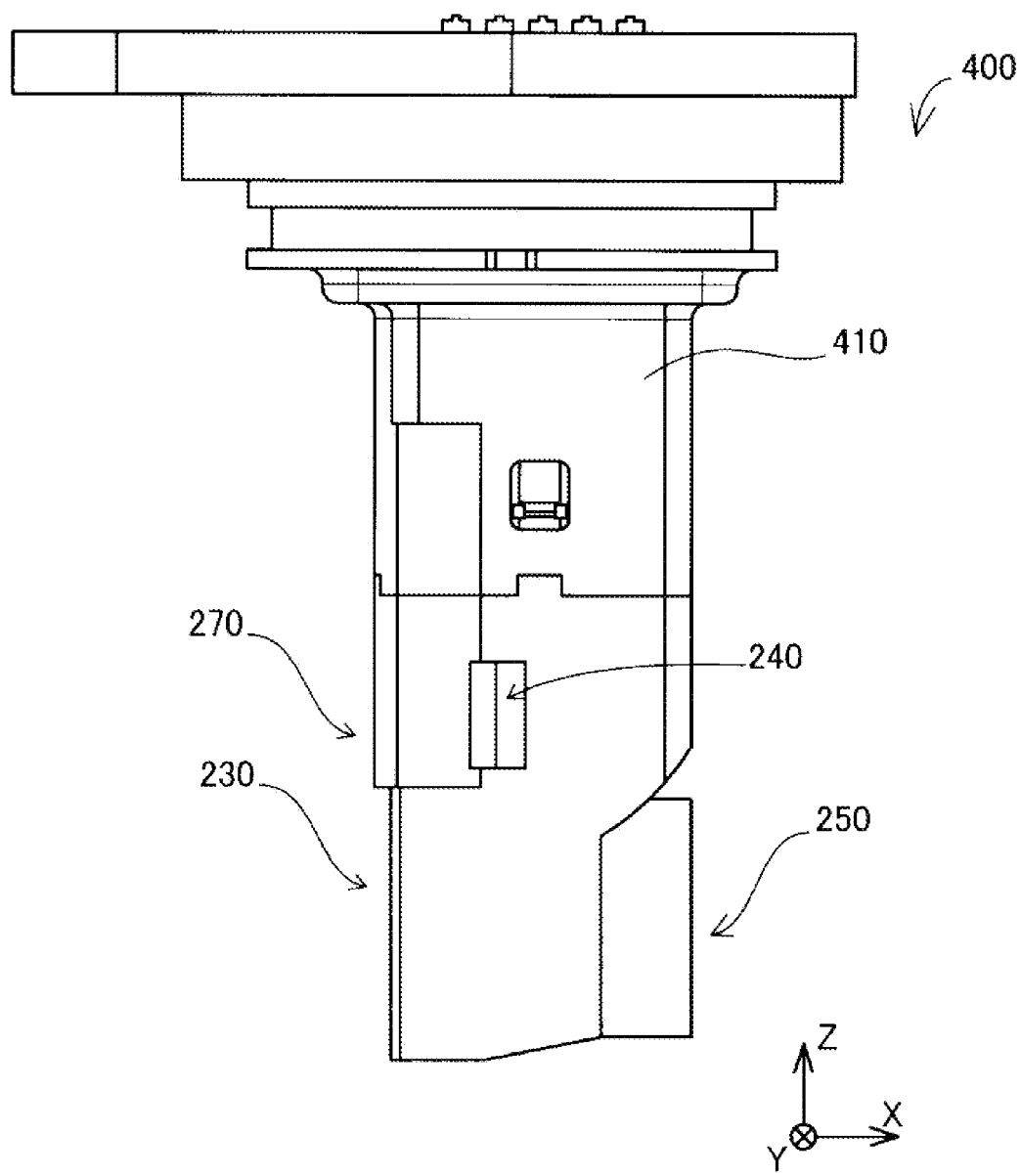
FIG. 10 is a schematic side view of the flow rate measurement device according to a second embodiment.

As shown in FIG. 10, the housing 410 of the flow rate measurement device 400 has an external shape different from the housing 210 (FIG. 2) in the first embodiment. For example, in the present embodiment, two outlet portions 240 (only one is disclosed in FIG. 10) are provided, and in addition to the outlet portion 240 provided on a side surface side shown in FIG. 10, another outlet portion is provided on a side surface on the opposite side. The two outlet portions 240 are provided on the side surfaces of the housing 410 that intersect the surface on which the inlet portion 230 is provided and the surface on which the discharge port 250 is provided, respectively.

Figure 11:
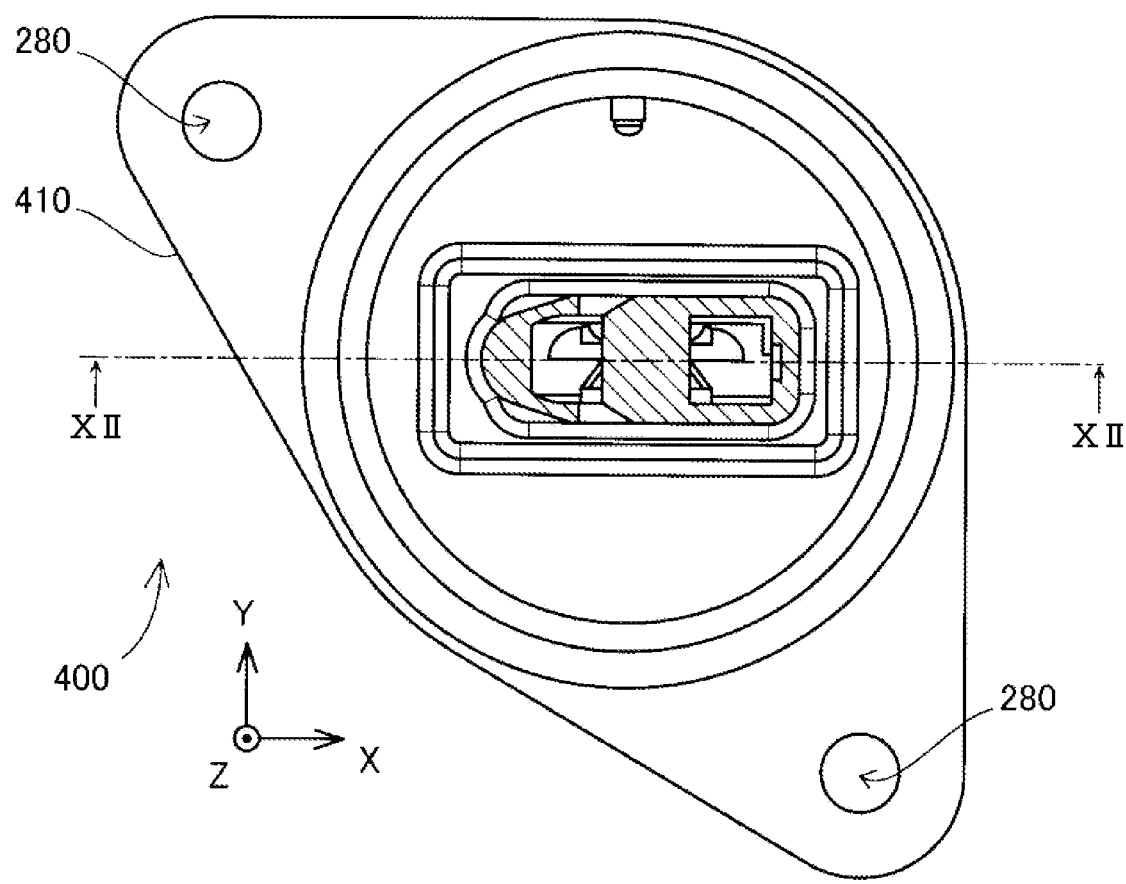
FIG. 11 is a schematic top view of the flow rate measurement device according to the second embodiment.

As shown in FIG. 11, when the flow rate measurement device 400 is viewed from the base end side (+Z axis direction side) in the insertion direction, the housing 410 has a bolt insertion holes 280 for in fixing to the main flow path 12.

Figure 12:
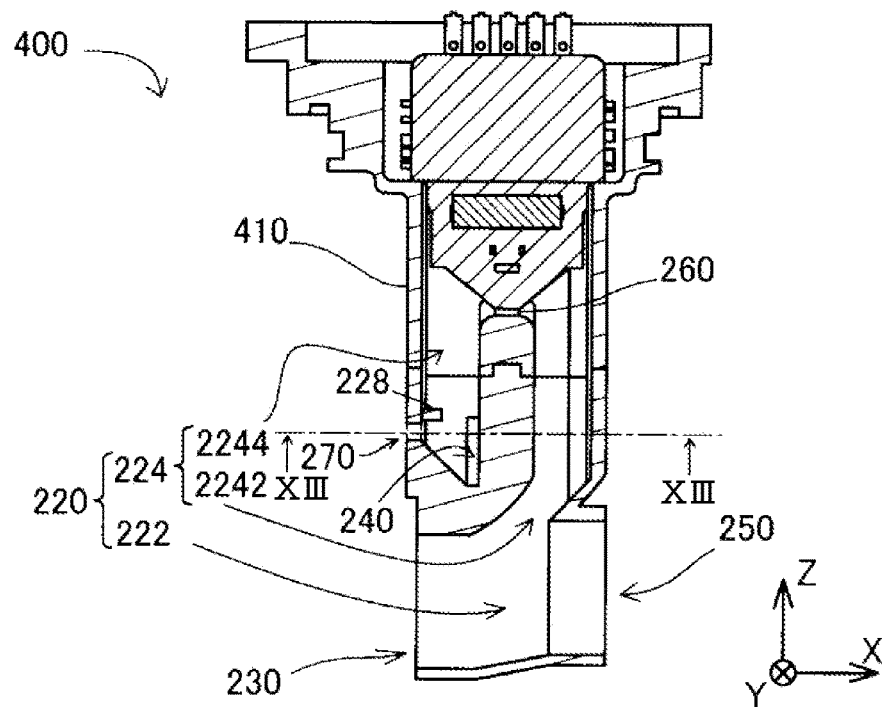
FIG. 12 is a schematic cross-sectional view of the flow rate measurement device along a XII-XII line shown in FIG. 11.

As shown in FIG. 12, the sub flow path 220 is formed inside the flow rate measurement device 200. The sub flow path 220 is provided with the flow rate detection unit 260. Similar to the housing 210 in the first embodiment, the housing 410 is a housing made of synthetic resin, and has a sub flow path forming portion that forms the sub flow path 220 therein, and a holding portion that holds the flow rate detection unit 260. As shown in FIG. 12, a communication hole 270 is formed in the downstream side detection flow path 2244, which is a section between the flow rate detection unit 260 and the outlet portion 240 in the sub flow path 220. Further, the convex portion 228 is provided between the communication hole 270 and the flow rate detection unit 260.

Figure 13:
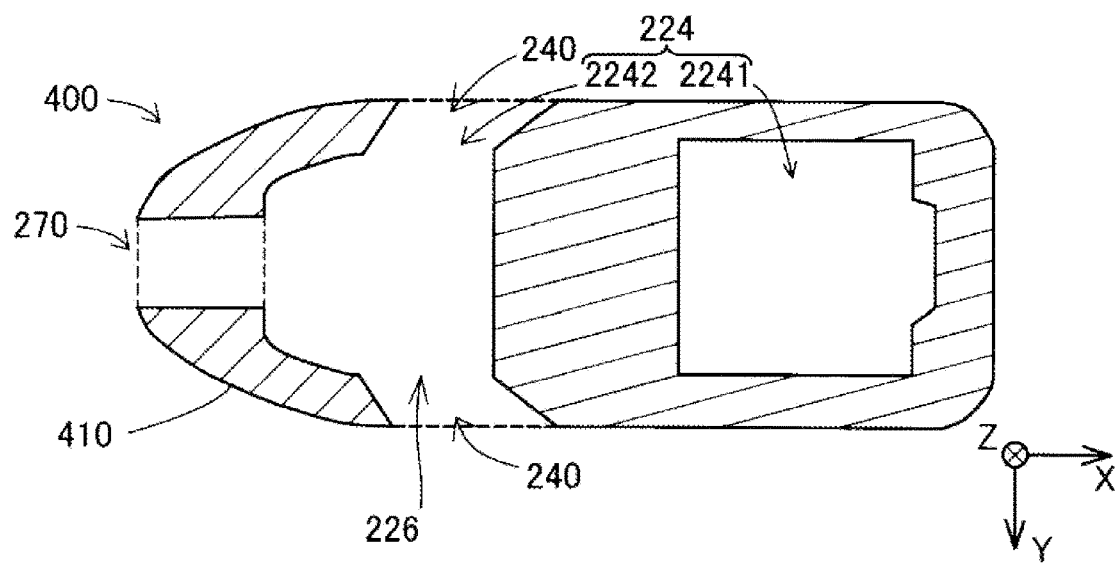
FIG. 13 is a schematic cross-sectional view of the flow rate measurement device along a XIII-XIII line shown in FIG. 12.

The sub flow path 220 is a passage through which a part of the intake air flowing through the main flow path 12 flows. In the present embodiment, the downstream side detection flow path 2244, which is the downstream side of the flow rate detection unit 260 of the sub flow path 220, has two branch flow paths 226 in which the flow path is branched into two paths as shown in FIG. 13. Each of the branch flow paths 226 is connected to each of two outlet portions 240. Further, in the Z-axis direction, which is a direction along the insertion direction, a communication hole is provided at substantially the same position where the outlet portion 240 is provided.

In the forward flow state, the water flowing in from the inlet portion 230 mainly flows out from the discharge port 250 to the main flow path 12. As in the case of the first embodiment, since heavy water droplets tend to move in the −Z axis direction due to gravity, it is difficult for them to flow into the detection flow path 224 extending in the upper side in the direction of gravity (+Z axis direction) where the flow rate detection unit 260 is arranged. Further, in the backflow state, the water flowing in from the outlet portion 240 mainly flows out from the communication hole 270 to the main flow path 12. Since heavy water droplets tend to move in the −Z axis direction due to gravity, so that it is difficult for them to flow above the communication hole 270 of the detection flow path 224 (in the +Z axis direction). Further, in the present embodiment, the flow path cross-sectional area of the region between the communication hole 270 and the flow rate detection unit 260 where the convex portion 228 is provided is reduced. Therefore, the flow path resistance between the communication hole 270 and the flow rate detection unit 260 is larger than the flow path resistance between the communication hole 270 and the outlet portion 240. As a result, the inflow of water above the communication hole 270 of the detection flow path 224 (in the +Z axis direction) is further suppressed.

According to the flow rate measurement device 400 according to the second embodiment described above, the same effect is obtained in that it has the same configuration as the first embodiment. Further, in the flow rate measurement device 400 according to the second embodiment, the sub flow path 220 branches between the flow rate detection unit 260 and the plurality of outlet portions 240, and has the branch flow paths 226 which communicate the plurality of outlet portions 240 with the communication holes 270. Further, at the time of backflow, the communication hole 270 is formed on the surface of the housing 410 provided with the inlet portion 230, which is a wall surface whose pressure is smaller than the pressure on the opposite surface. Therefore, the flow rate measurement device 400 can more efficiently discharge the water from the sub flow path 220 at the time of backflow.

C. Other Embodiments

C1. First Other Embodiment

Figure 14:
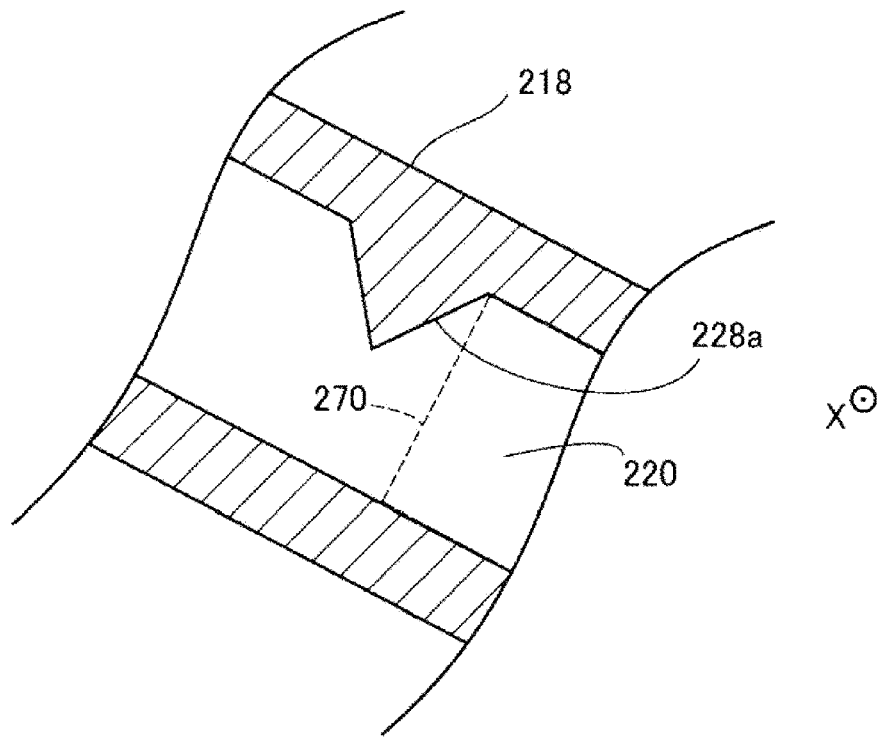
FIG. 14 is a first schematic cross-sectional view of the convex portion in a first other embodiment.
Figure 15:
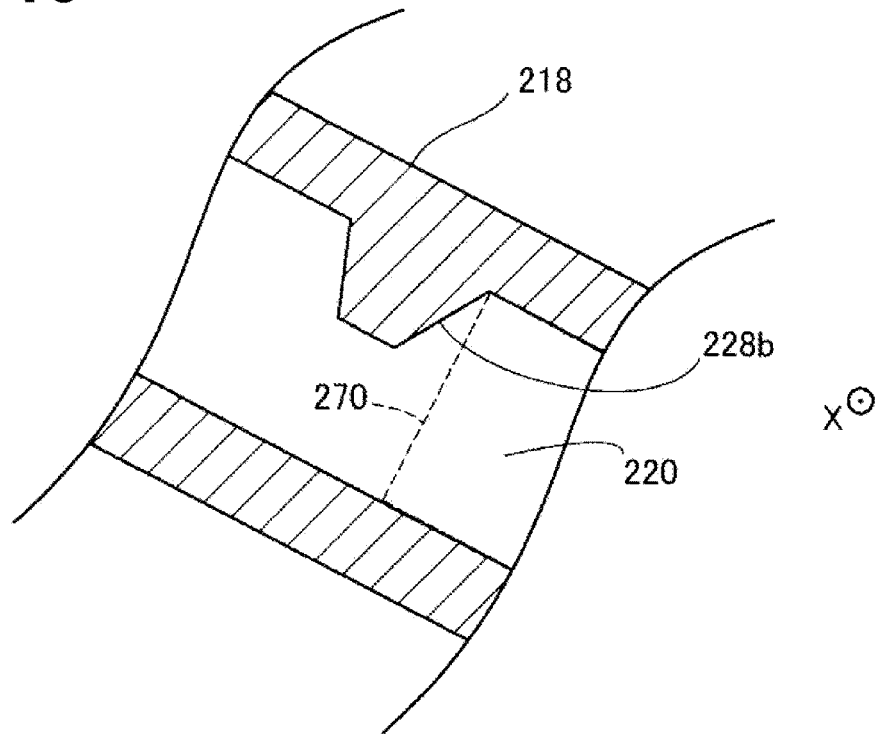
FIG. 15 is a second schematic cross-sectional view of the convex portion in the first other embodiment.
Figure 16:
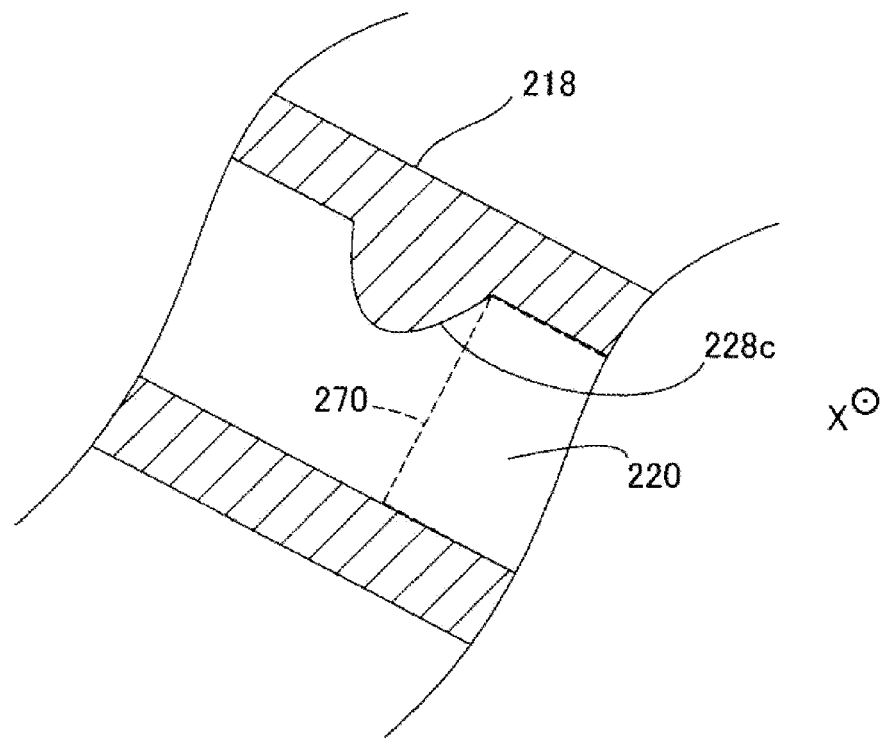
FIG. 16 is a third schematic cross-sectional view of the convex portion in the first other embodiment.
Figure 17:
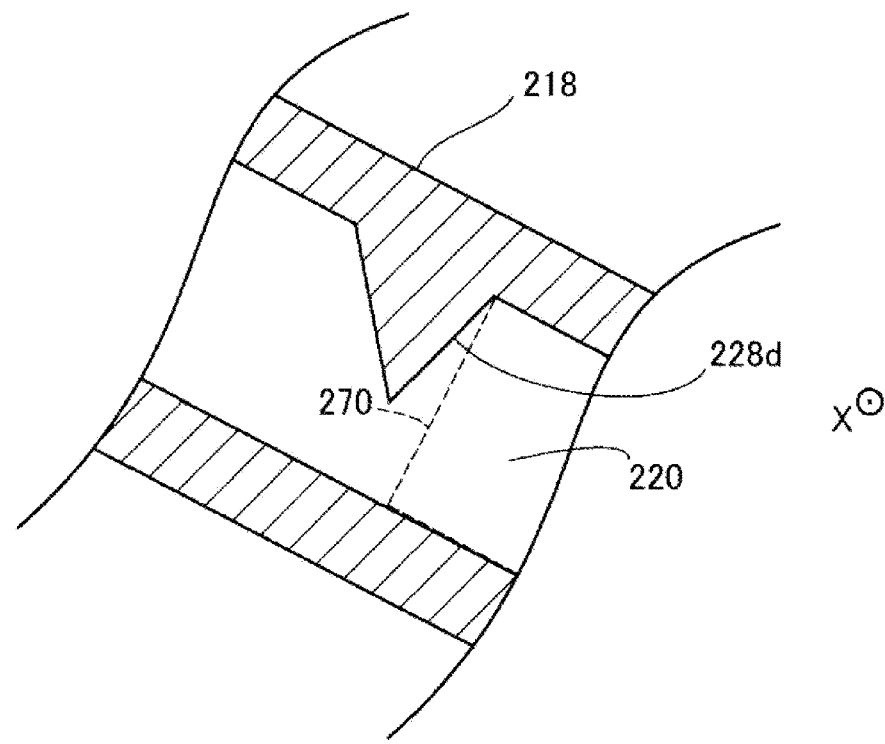
FIG. 17 is a fourth schematic cross-sectional view of the convex portion in the first other embodiment.
Figure 18:
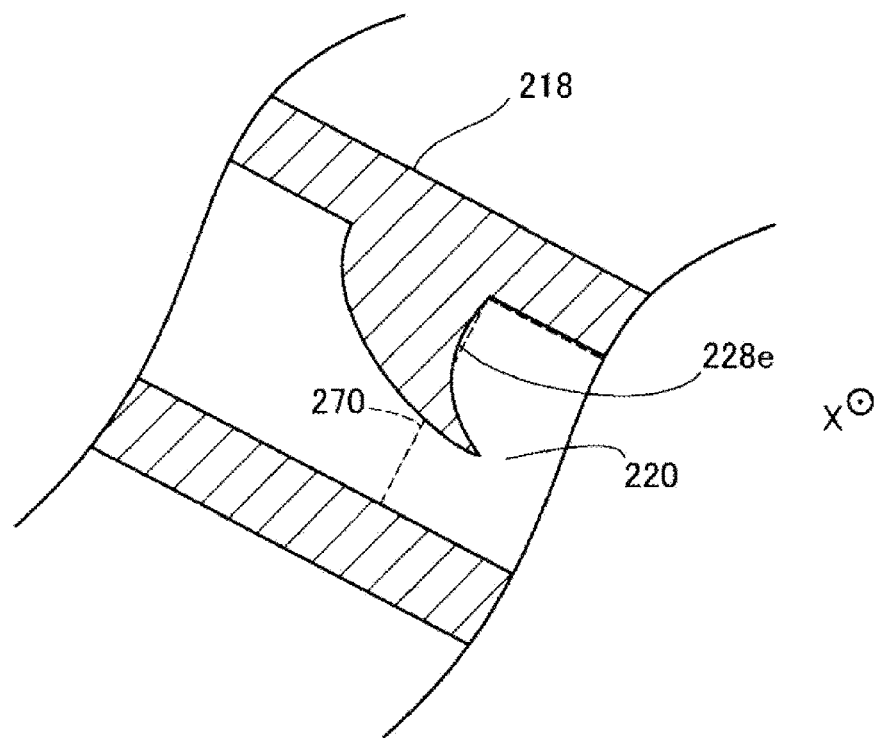
FIG. 18 is a fifth schematic cross-sectional view of the convex portion in the first other embodiment.
Figure 19:
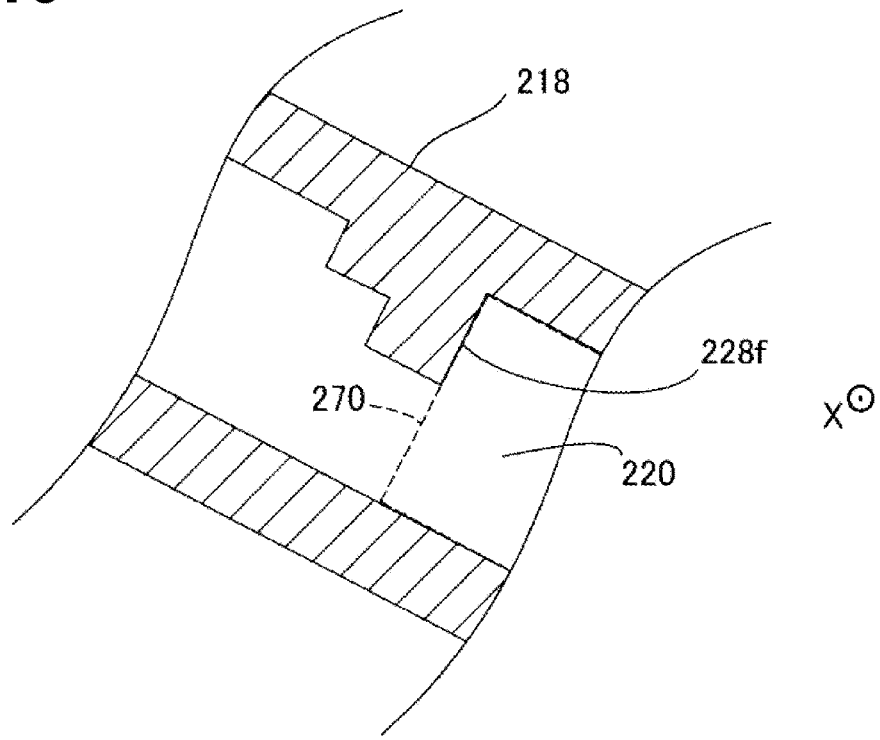
FIG. 19 is a sixth schematic cross-sectional view of the convex portion in the first other embodiment.

In the above embodiments, the flow rate measurement devices 200 and 400 have the stepped convex portions 228 as shown in FIG. 7, for example. However, the shape of the convex portion 228 is not limited to this configuration. The convex portion 228 may have a shape that reduces the flow path cross-sectional area of the detection flow path 224. Hereinafter, an example of the shape of the convex portion 228 that can be adopted will be described with reference to FIGS. 14 to 19. For example, as shown in FIG. 14, the convex portion 228a may have a shape that is sharp toward the inside of the detection flow path 224. Further, for example, as shown in FIG. 15, the convex portion 228b has a shape having inclined side surfaces and a planar end surface. Further, for example, as shown in FIG. 16, the convex portion 228c may have a curved surface shape. Further, for example, as shown in FIG. 17, the convex portion 228d may have a shape that is sharp toward the inside of the detection flow path 224, and the inclination angle is different between the upstream side and the downstream side of the detection flow path 224. Further, for example, as shown in FIG. 18, the convex portion 228e may have a shape that protrudes inward of the detection flow path 224 and is curved so that a tip thereof faces the detection flow path 224 side. The shape of the convex portion 228e is a shape more suitable for capturing the water flowing in from the downstream side. As shown in FIG. 19, the convex portion 228f may have a plurality of stepped portions. If it is possible to reduce the flow path cross-sectional area of the detection flow path 224, it is not always necessary to have the convex portion 228. For example, instead of the convex portion 228, a part of the detection flow path 224 may have a thin shape.

C2. Second Other Embodiment

Figure 20:
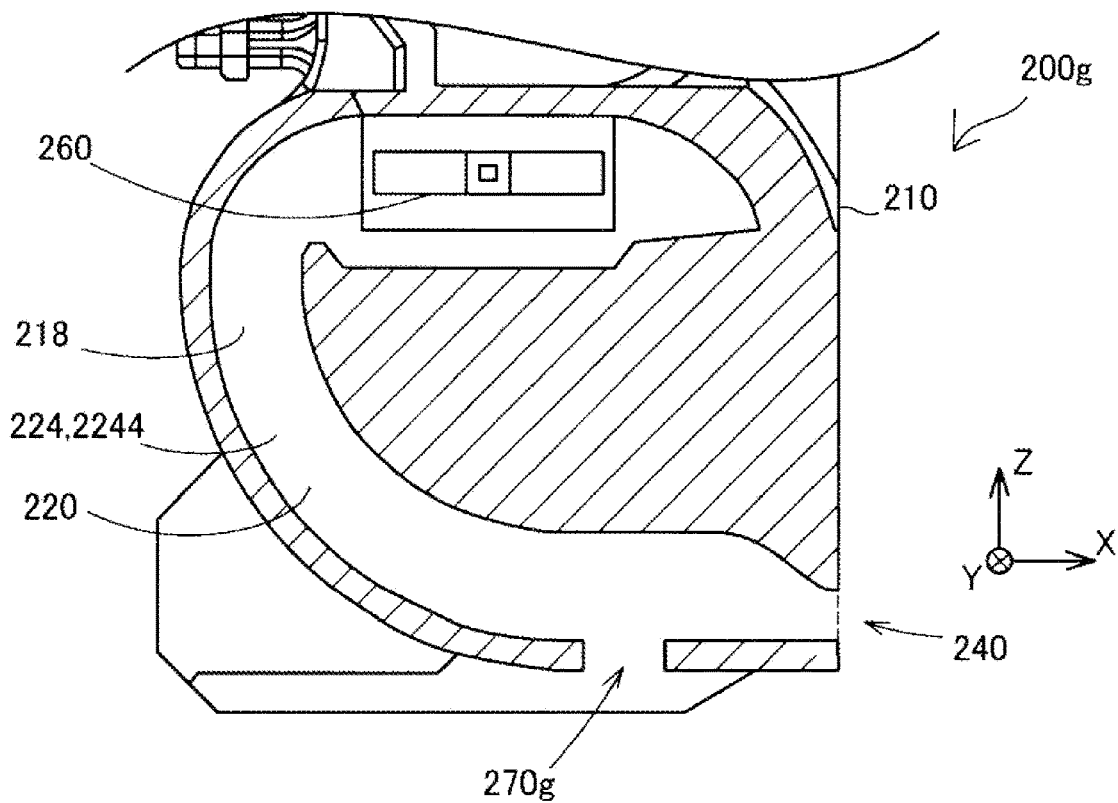
FIG. 20 is a first explanatory view of a formation position of the communication hole in a second other embodiment.

In the above embodiment, the formation position of the communication hole 270 can be appropriately changed as long as it is provided in the section between the flow rate detection unit 260 and the outlet portion 240 in the detection flow path 224. Hereinafter, an example of the formation position of the communication hole 270 that can be adopted will be described with reference to FIGS. 20 to 26. In FIGS. 20 to 26, the flow path structure of the flow rate measurement device 200 according to the first embodiment is adopted. Further, in FIGS. 20 to 26, the convex portion 228 is omitted for convenience of explanation. For example, as shown in FIG. 20, the flow rate measurement device 200g has a communication hole 270g on the downstream side, that is, on the side closer to the outlet portion 240, as compared with the flow rate measurement device 200 according to the first embodiment. In this case, an opening of the communication hole 270g is formed on the tip surface of the flow rate measurement device 200g on the insertion direction (−Z axis direction) side. Even in this case, the pressure outside the communication hole 270g is smaller than the pressure on the outlet portion 240 side in the backflow state. Therefore, the movement of water from the outlet portion 240 to the communication hole 270g becomes smooth.

Figure 21:
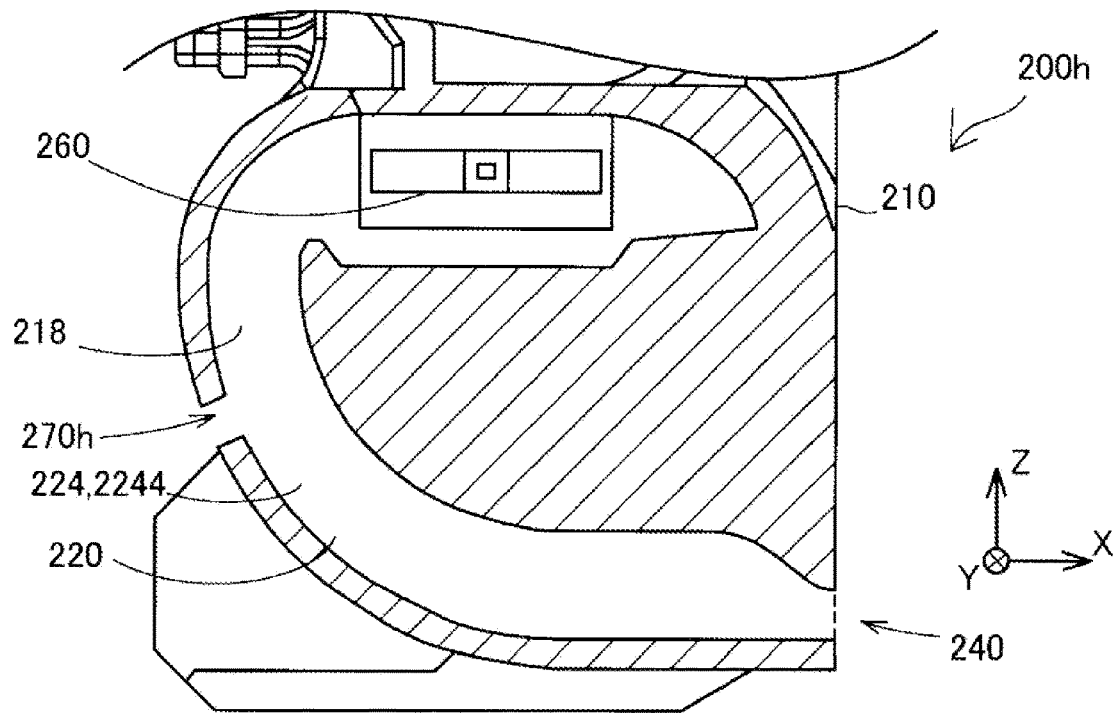
FIG. 21 is a second explanatory view of the formation position of the communication hole in the second other embodiment.
Figure 22:
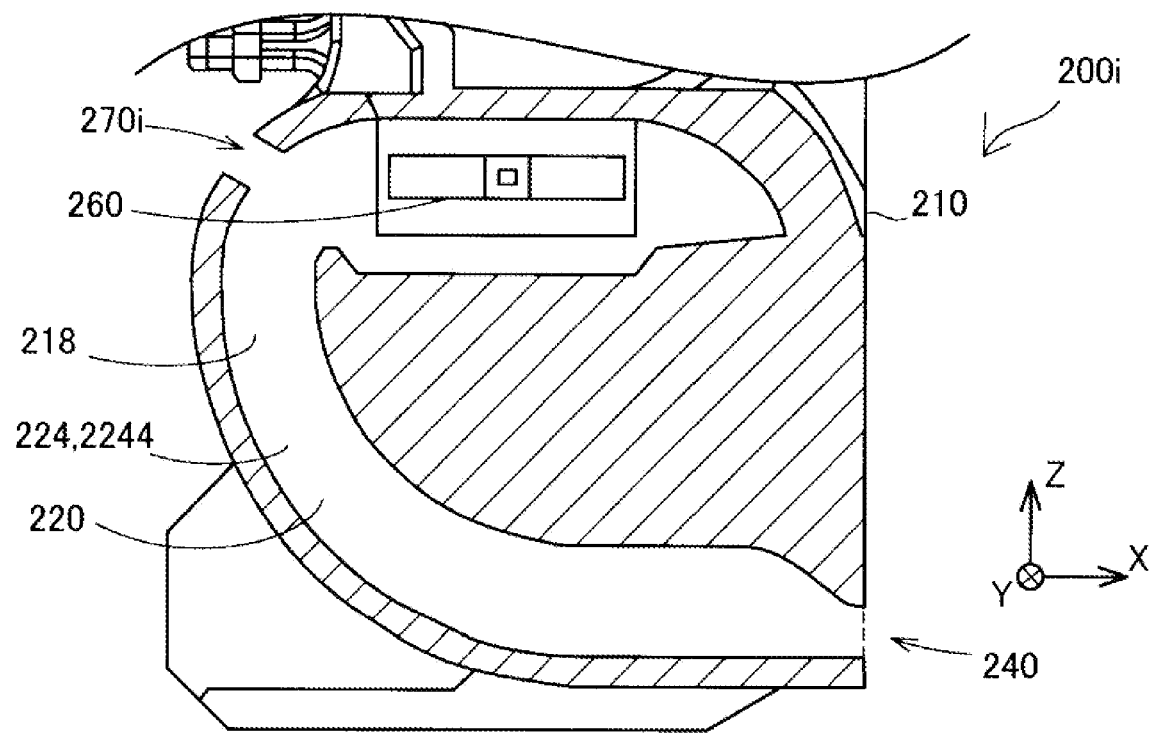
FIG. 22 is a third explanatory view of the formation position of the communication hole in the second other embodiment.

Further, as shown in FIGS. 21 and 22, the flow rate measurement devices 200h and 200i have communication holes 270h, 270i closer to the upstream side, that is, the side closer to the flow rate detection unit 260 than the flow rate measurement device 200 according to the first embodiment. For example, the flow rate measurement device 200h shown in FIG. 21 has a communication hole 270h formed near the center of the downstream side detection flow path 2244. Further, for example, the flow rate measurement device 200i shown in FIG. 22 has a communication hole 270i formed on the upstream side from the center of the downstream side detection flow path 2244. The openings of the communication holes 270h and 270i shown in FIGS. 21 and 22 are provided on the side surfaces where the inlet portion 230 of the flow rate measurement devices 200h and 200i is provided. Even in this case, the pressure outside the communication holes 270h and 270i is smaller than the pressure on the outlet portion 240 side in the backflow state. Therefore, the movement of water from the outlet portion 240 to the communication holes 270h and 270i becomes smooth. Further, when the communication holes 270h and 270i are provided on the side surface where the inlet portion 230 of the flow rate measurement devices 200h and 200i is provided, the water flows out of the communication holes 270h and 270i due to the inertia acting as it moves from the outlet portion 240 toward the upstream side. Therefore, the movement of water from the outlet portion 240 to the communication holes 270h and 270i becomes smoother.

Figure 23:
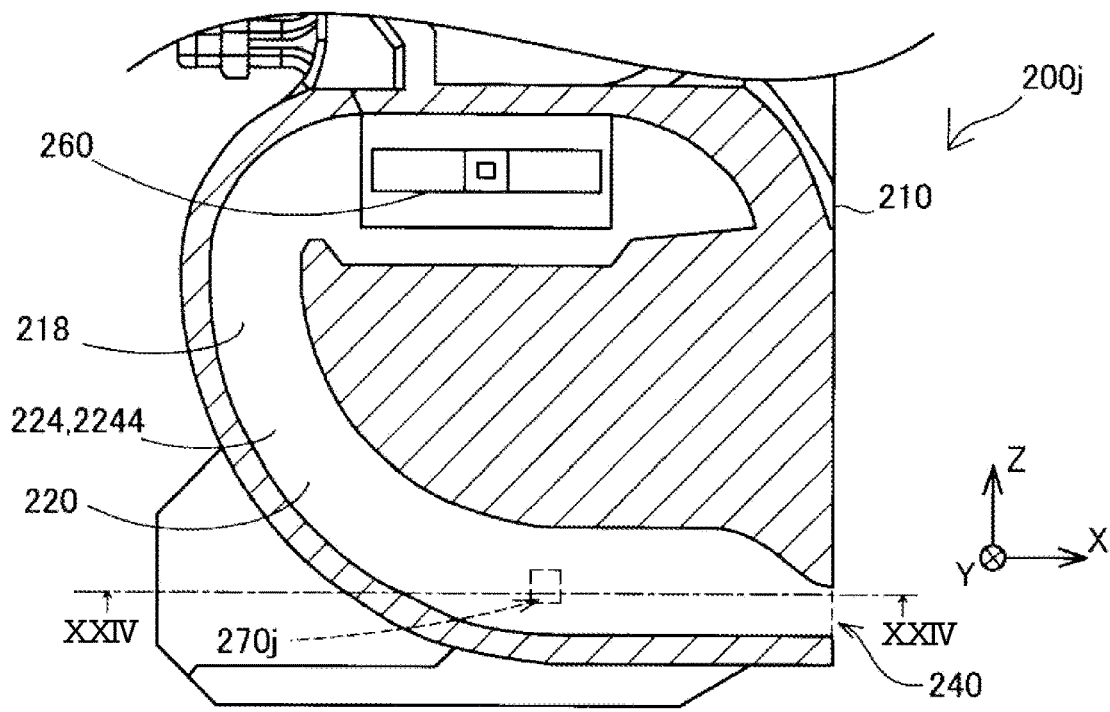
FIG. 23 is a fourth explanatory view of the formation position of the communication hole in the second other embodiment.
Figure 24:
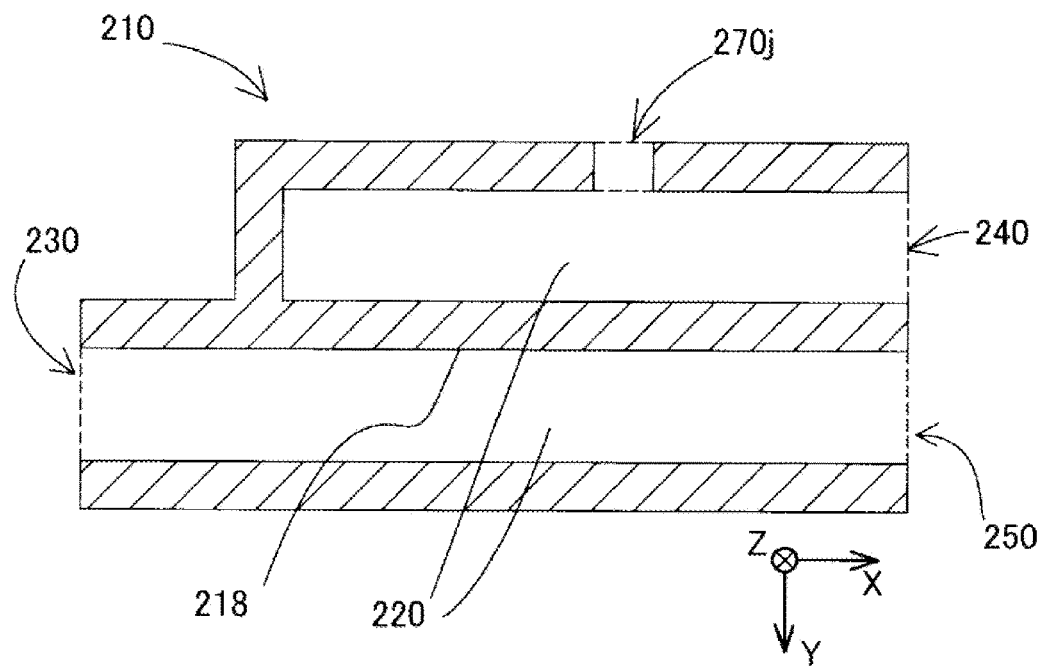
FIG. 24 is a schematic cross-sectional view taken along the line XXIV-XXIV shown in FIG. 23.

Further, as shown in FIG. 23, the flow rate measurement device 200j may have a communication hole 270j provided on the side surface that intersects the side surface where the inlet portion 230 is provided and the tip surface. As shown in FIG. 24, the flow rate measurement device 200j has the communication hole 270j that opens in the −Y axis direction, that is, has an opening direction that intersects the direction in which the sub flow path 220 extends. Even in this case, the pressure outside the communication hole 270j is smaller than the pressure on the outlet portion 240 side in the backflow state. Therefore, the movement of water from the outlet portion 240 to the communication hole 270j becomes smooth.

Figure 25:
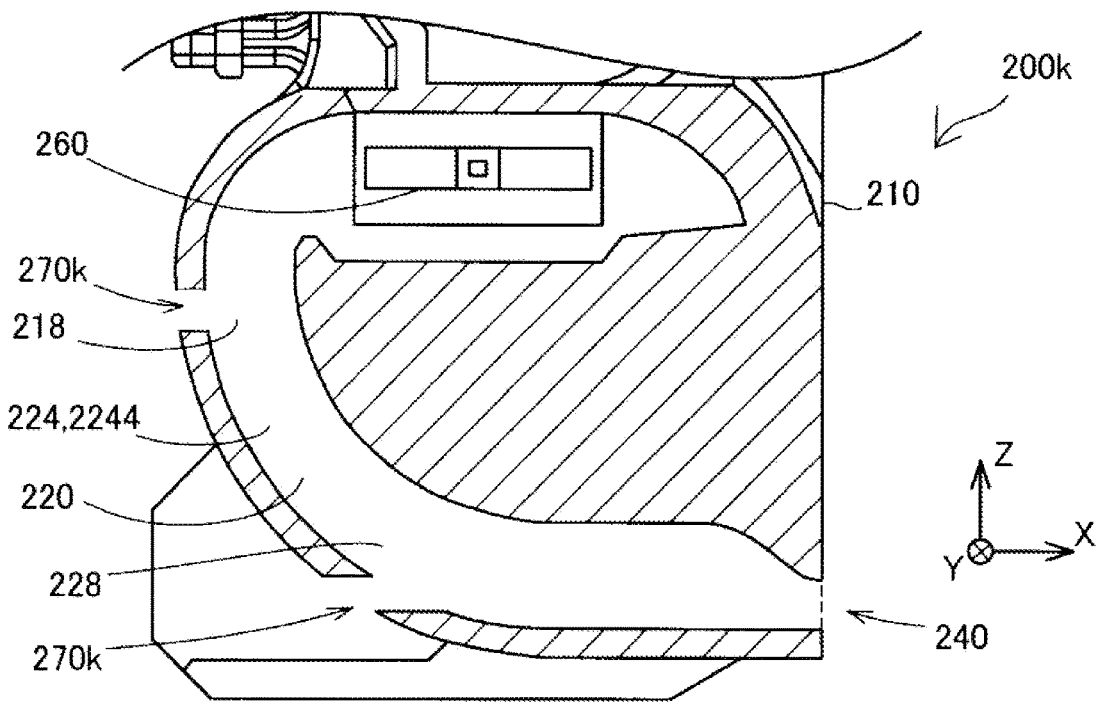
FIG. 25 is a fifth explanatory view of the formation position of the communication hole in the second other embodiment.
Figure 26:
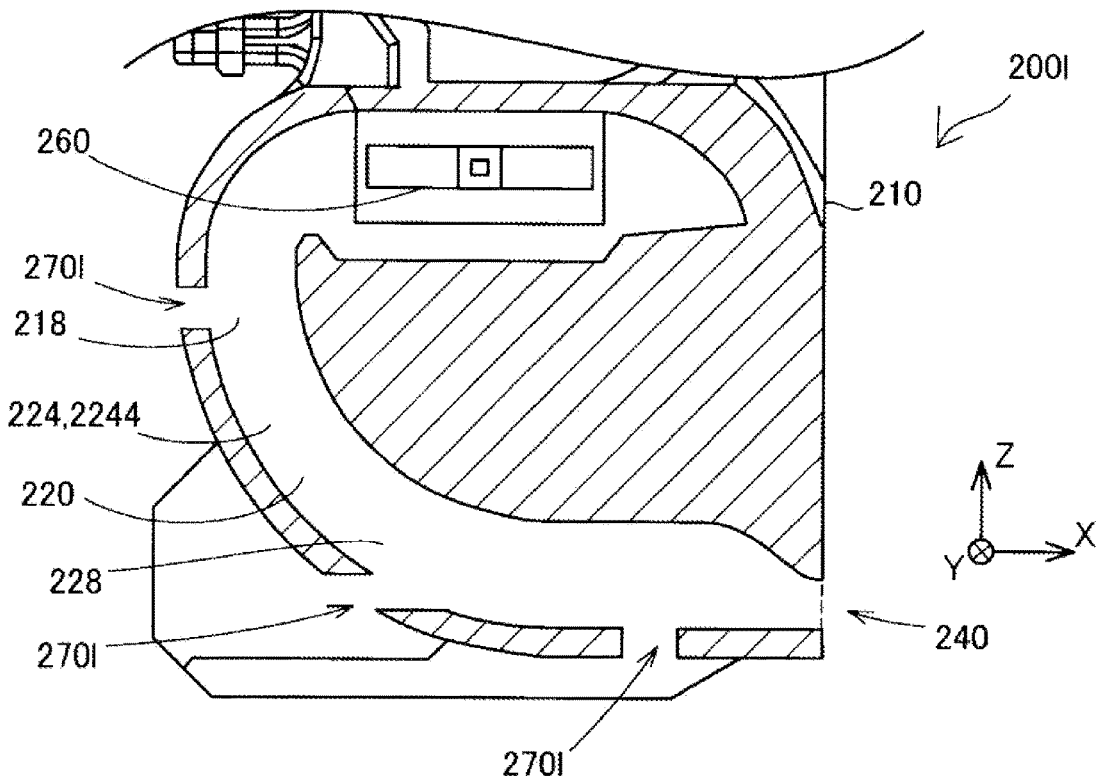
FIG. 26 is a sixth explanatory view of the formation position of the communication hole in the second other embodiment.

Further, as shown in FIGS. 25 and 26, the number of communication holes 270 is not limited to one. For example, as shown in FIG. 25, the flow rate measurement device 200k may have two communication holes 270k. Further, as shown in FIG. 26, the flow rate measurement device 200l may have three communication holes 270l.

C3. Third Other Embodiment

Figure 27:
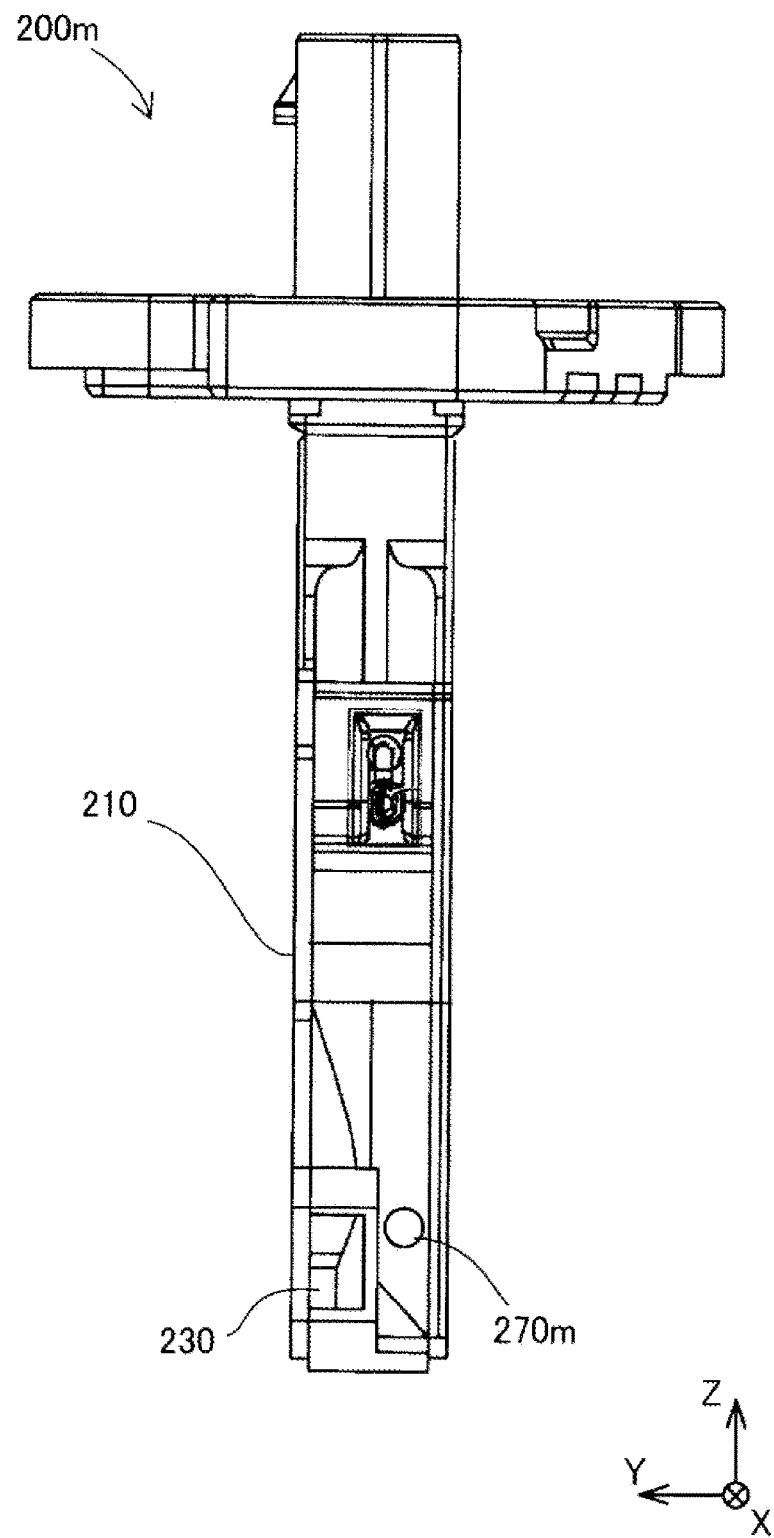
FIG. 27 is a first explanatory view of the shape of the communication hole in a third other embodiment.
Figure 28:
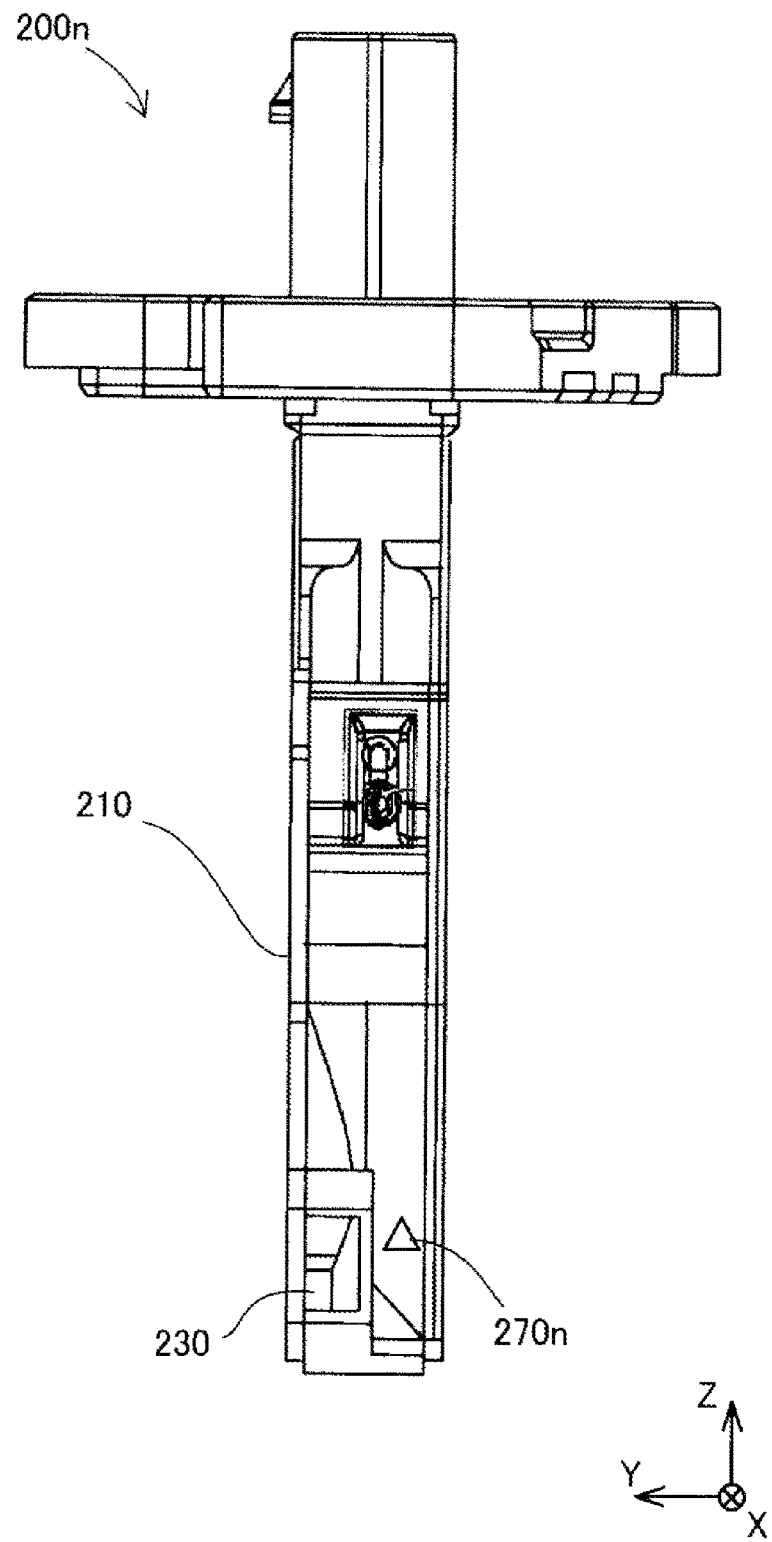
FIG. 28 is a second explanatory view of the shape of the communication hole in the third other embodiment.
Figure 29:
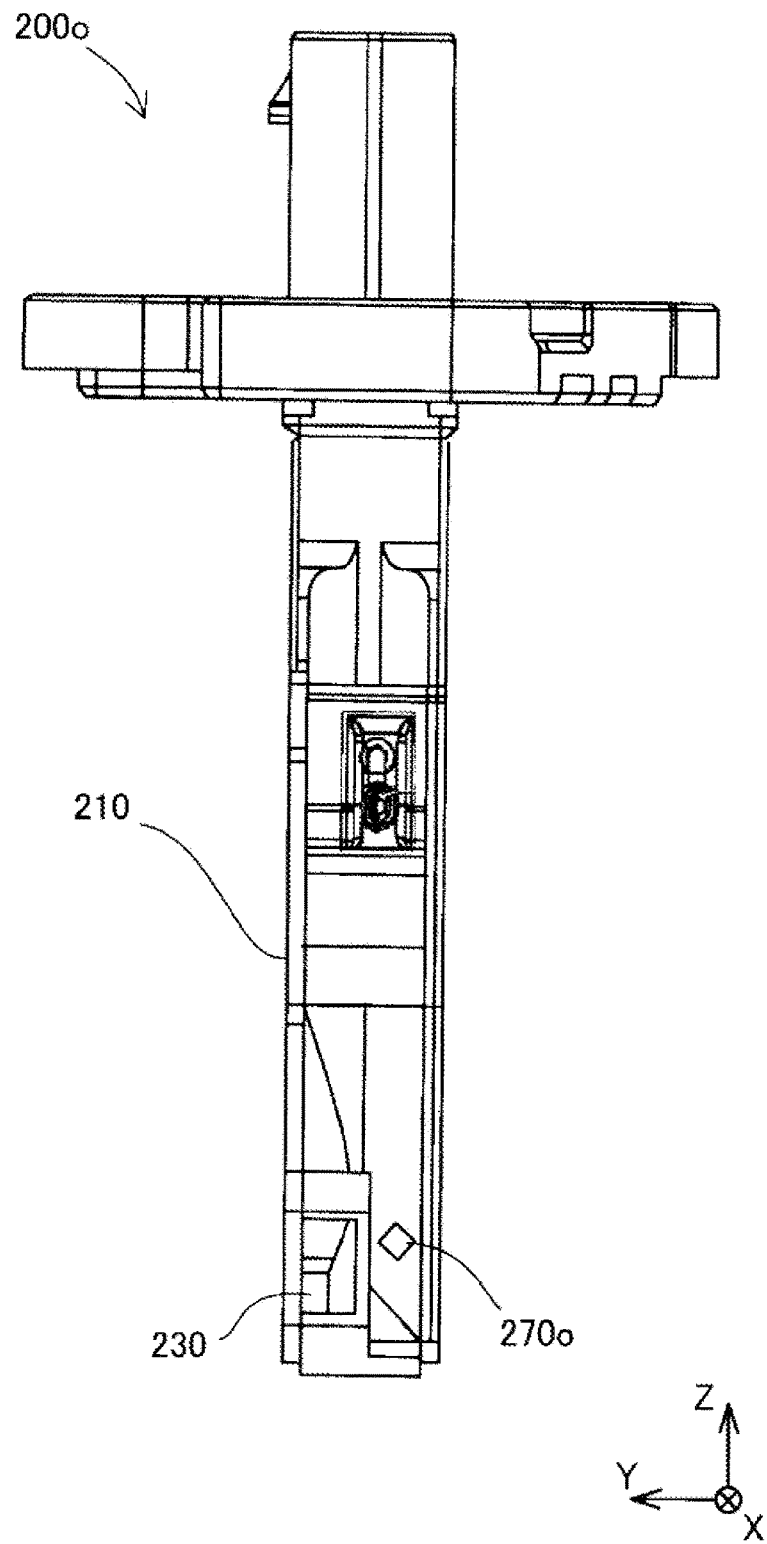
FIG. 29 is a third explanatory view of the shape of the communication hole in the third other embodiment.
Figure 30:
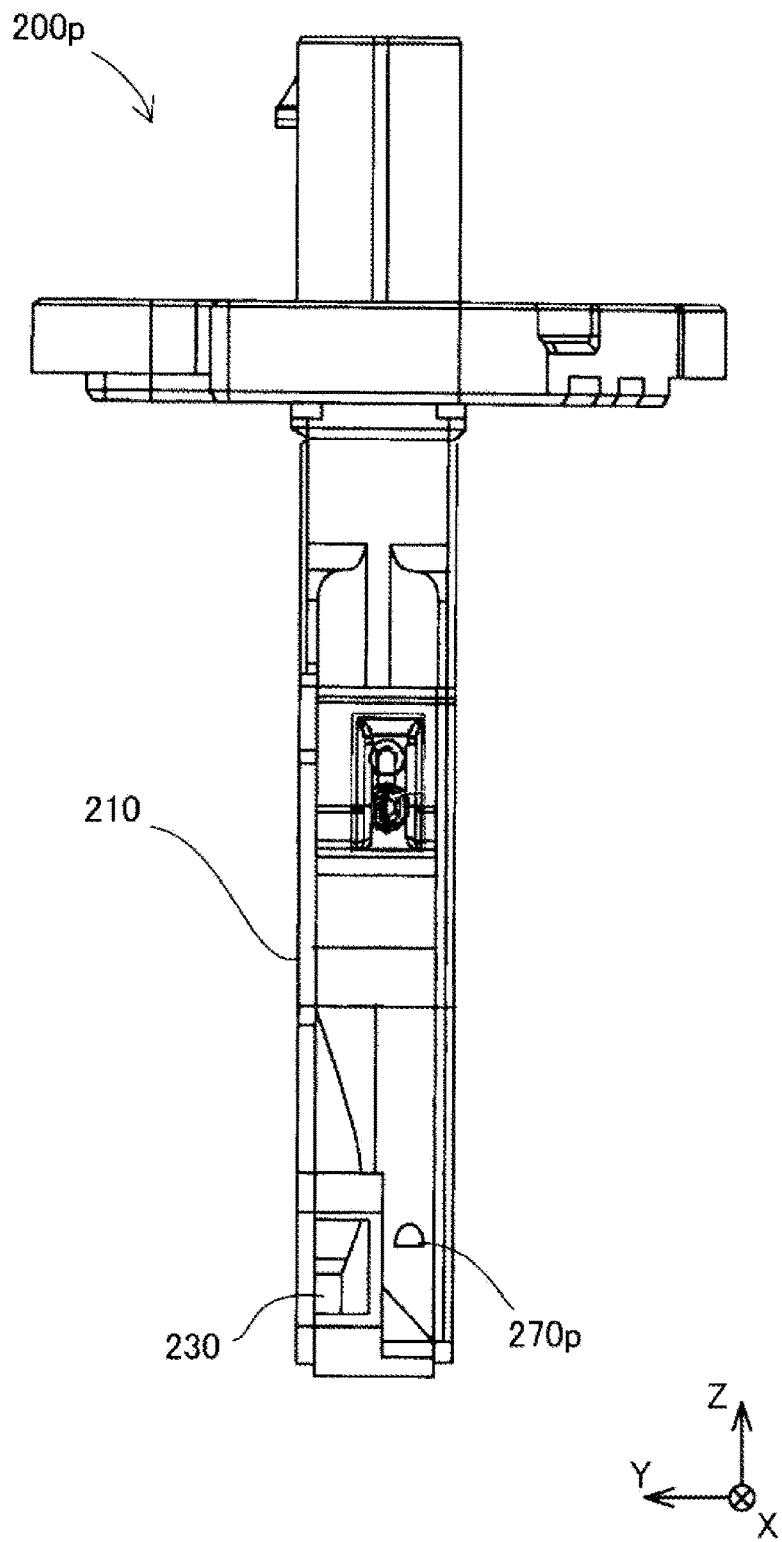
FIG. 30 is a fourth explanatory view of the shape of the communication hole in the third other embodiment.
Figure 31:
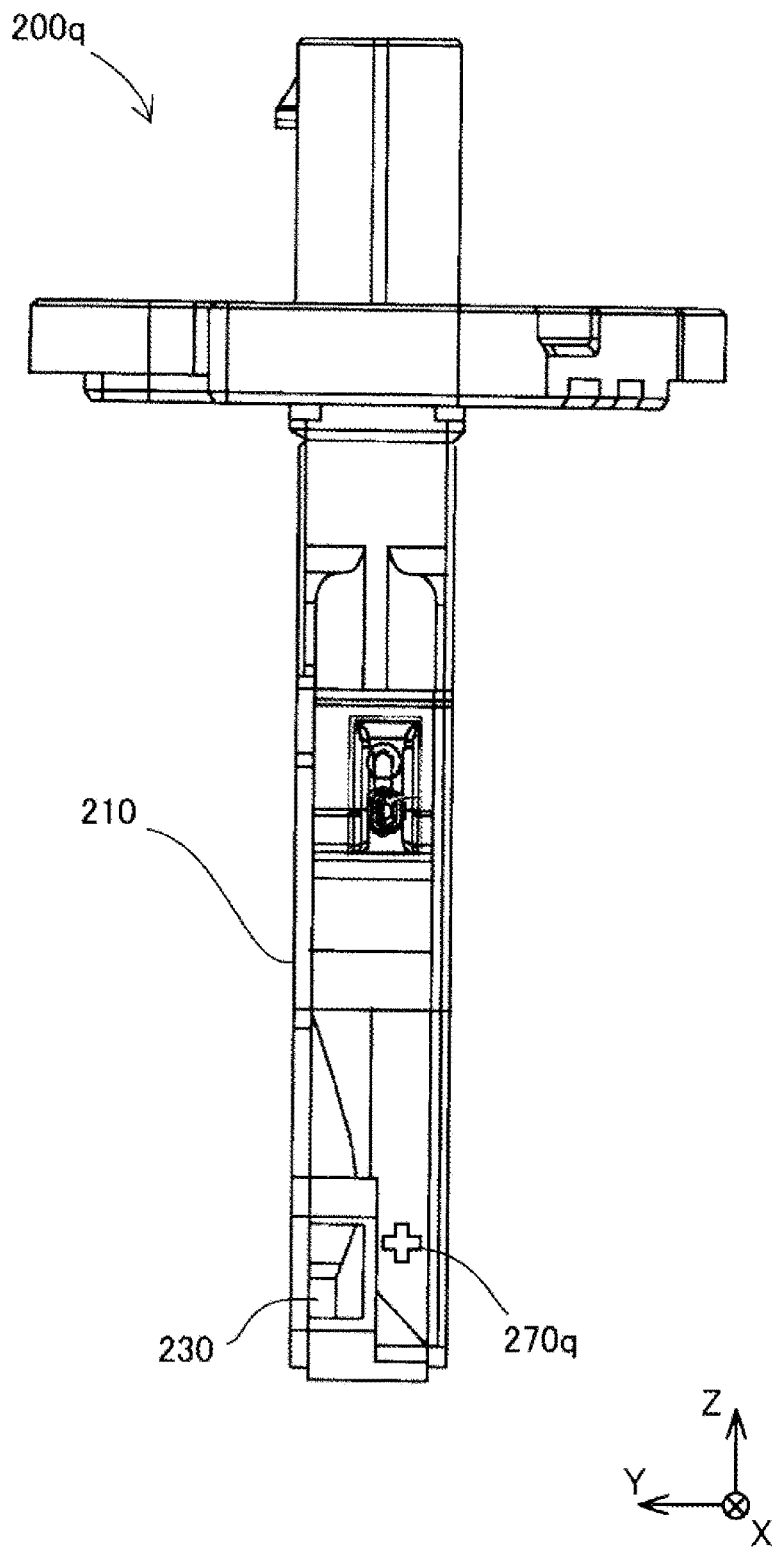
FIG. 31 is a fifth explanatory view of the shape of the communication hole in the third other embodiment.
Figure 32:
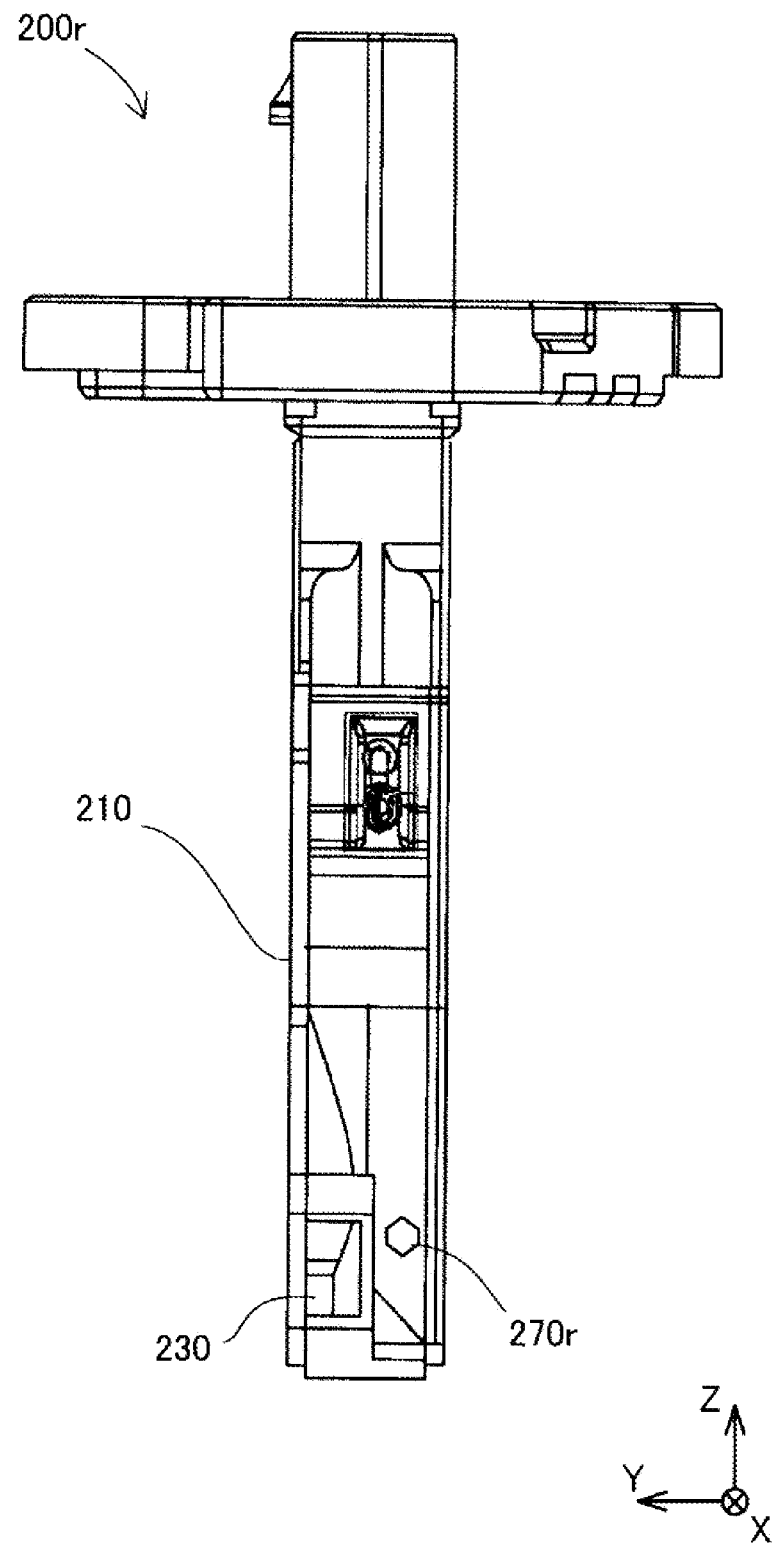
FIG. 32 is a sixth explanatory view of the shape of the communication hole in the third other embodiment.

In the above embodiments, the shape of the opening of the communication hole 270 is a quadrangle, but the shape of the opening of the communication hole 270 is not limited to the quadrangle. In the following, an example of the shape of the opening of the communication hole 270 that can be adopted will be described with reference to FIGS. 27 to 32. For example, as shown in FIG. 27, the flow rate measurement device 200m may have a communication hole 270m having a circular opening shape. Further, as shown in FIG. 28, the flow rate measurement device 200n may have a communication hole 270n having a triangular opening shape. Further, as shown in FIG. 29, the flow rate measurement device 200o may have a communication hole 270o having a diamond-shaped opening. Further, as shown in FIG. 30, the flow rate measurement device 200p may have a communication hole 270p in which a tip side (−Z axis direction side) of the flow rate measurement device 200p extends in the horizontal direction, and a proximal end side (+Z axis direction side) has an arcuate shape. Further, as shown in FIG. 31, the flow rate measurement device 200q may have a communication hole 270q having a cross-shaped opening. Further, as shown in FIG. 32, the flow rate measurement device 200r may have a polygonal, specifically, hexagonal communication hole 270r having four or more vertices in the shape of the opening.

C4. Fourth Other Embodiment

Figure 33:
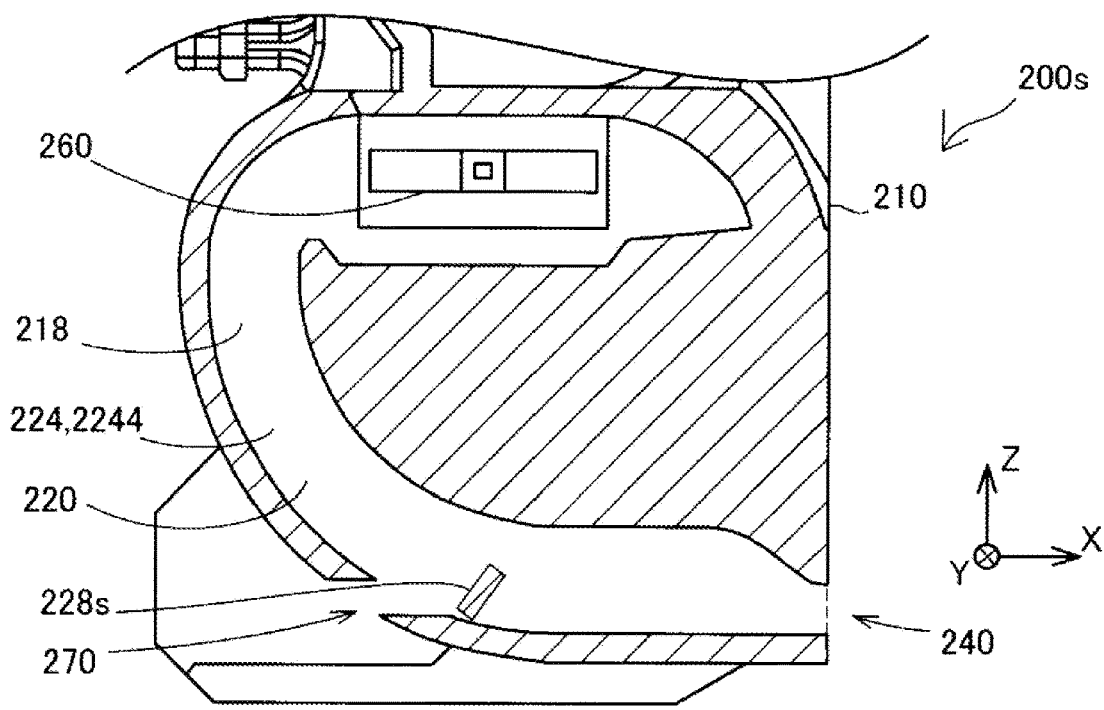
FIG. 33 is a first explanatory view of the formation position of the convex portion in a fourth other embodiment.
Figure 34:
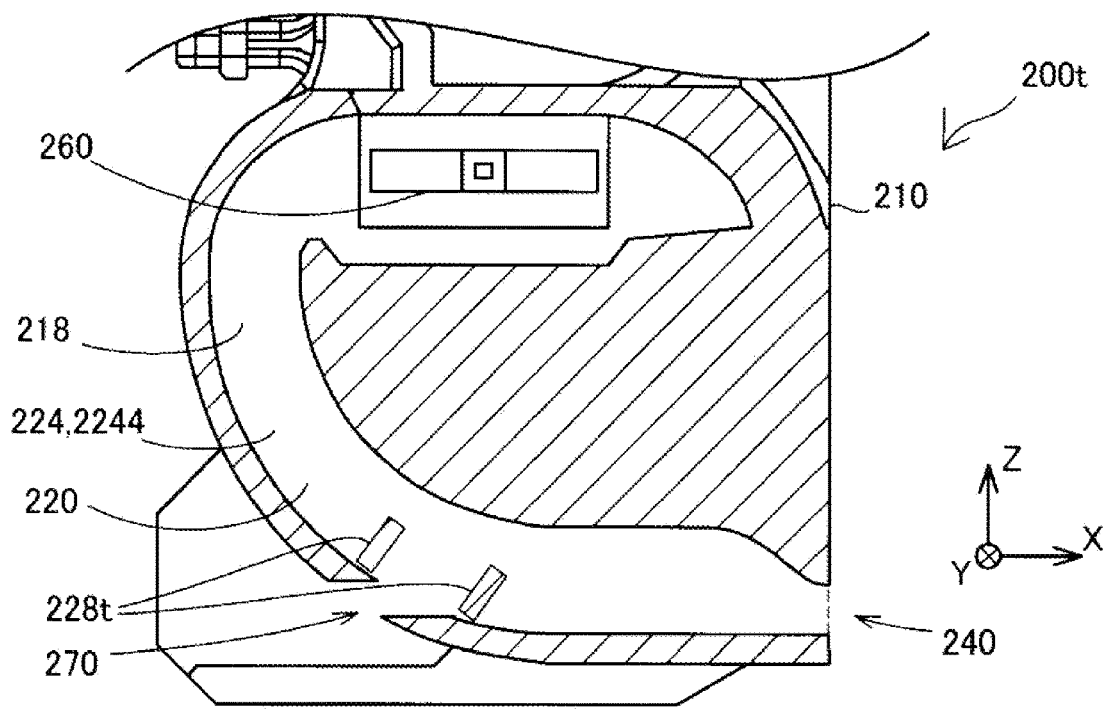
FIG. 34 is a second explanatory view of the formation position of the convex portion in the fourth other embodiment.
Figure 35:
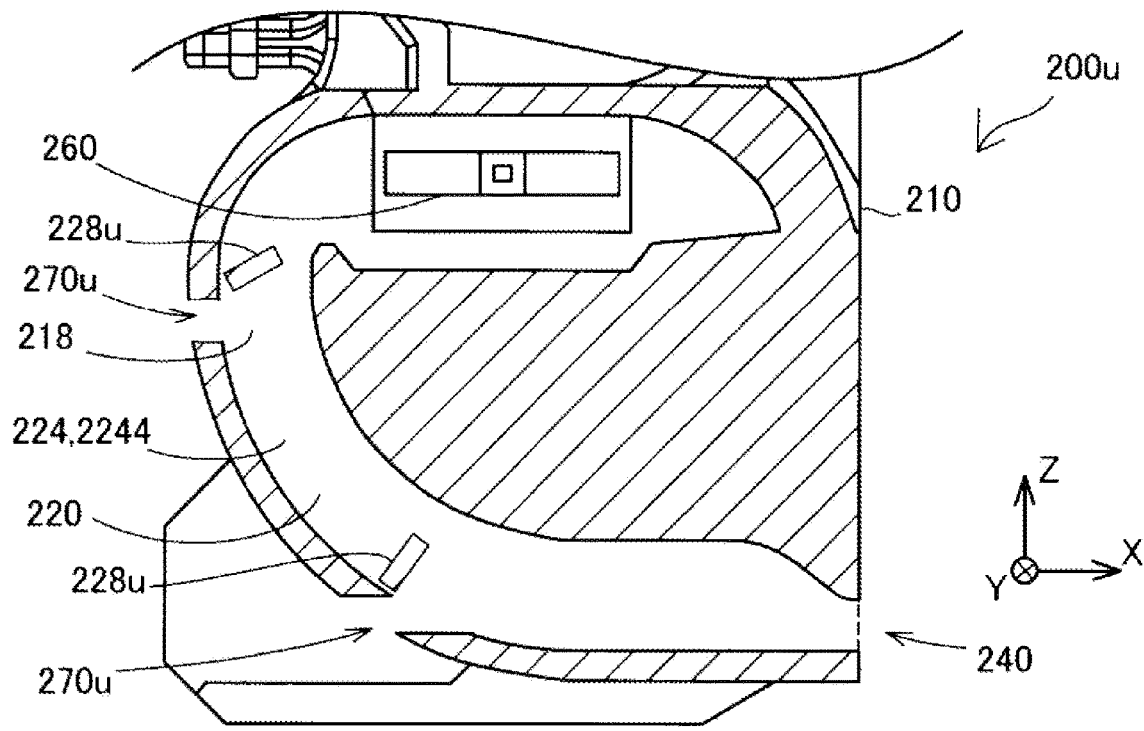
FIG. 35 is a third explanatory view of the formation position of the convex portion in the fourth other embodiment.

In the above embodiments, the flow rate measurement devices 200 and 400 have the convex portion 228 formed between the communication hole 270 and the flow rate detection unit 260 at a position adjacent to the communication hole 270. However, the formation position of the convex portion 228 is not limited to this configuration. For example, as shown in FIG. 33, the flow rate measurement device 200s may have a convex portion 228s formed between the communication hole 270 and the outlet portion 240. Further, for example, as shown in FIG. 34, the flow rate measurement device 200t may have two convex portions 228t. One of the convex portions 228t is a convex portion 2281t formed between the communication hole 270 and the flow rate detection unit 260, and another of the convex portions 228t is a convex portion 2282t formed between the communication hole 270 and the outlet portion 240. Further, as shown in FIG. 35, when the flow rate measurement device 200u has a plurality of communication holes 270u, each of the convex portions 228u may be provided in the vicinity of each of the plurality of communication holes 270u.

In the description of the first to fourth other embodiments described above, the flow path structure of the flow rate measurement device 200 according to the first embodiment is applied, but the flow path structure of the flow rate measurement device 400 according to the second embodiment can be applied in the same manner.

C5. Fifth Other Embodiment

Figure 36:
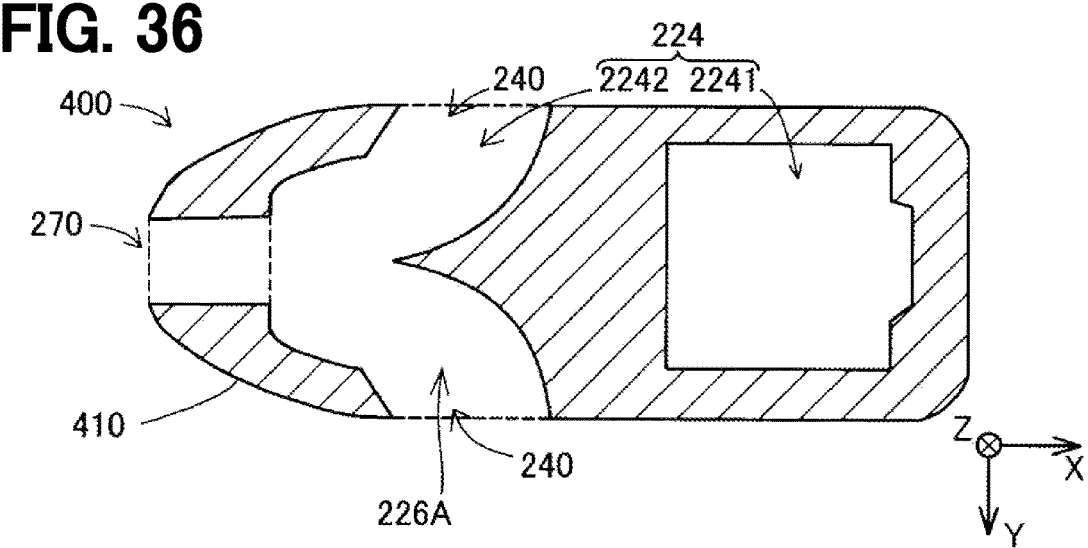
FIG. 36 is a first cross-sectional view of the branch flow path according to a fifth other embodiment.
Figure 37:
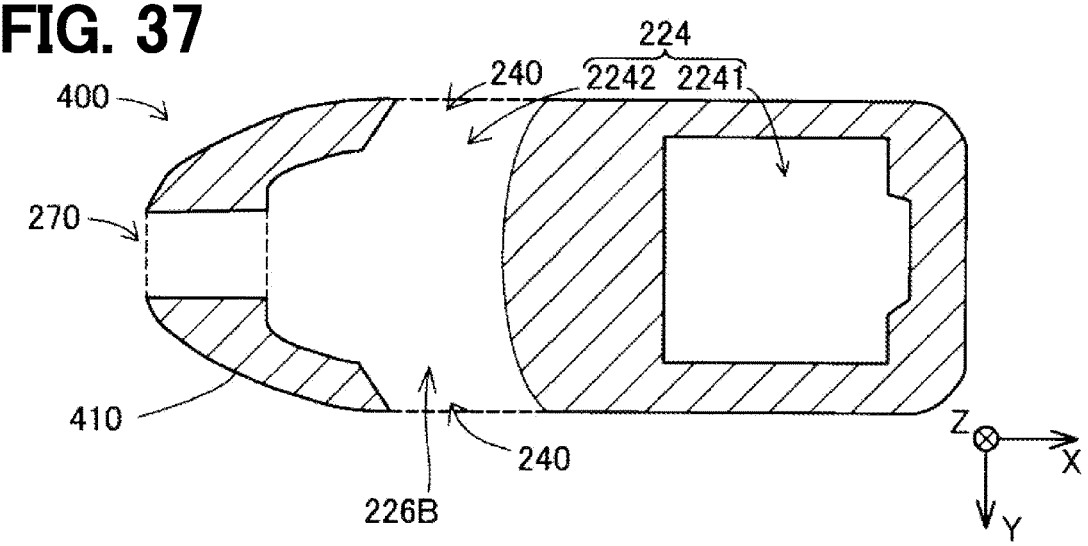
FIG. 37 is a second cross-sectional view of the branch flow path according to the fifth other embodiment.
Figure 38:
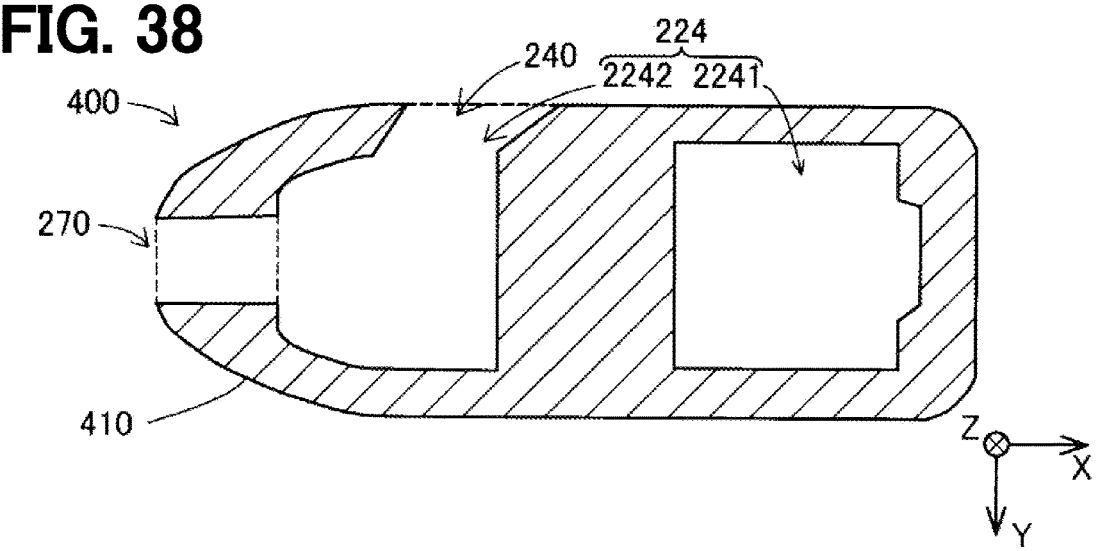
FIG. 38 is a third cross-sectional view of the detection flow path according to the fifth other embodiment.

The flow rate measurement device 400 according to the second embodiment has the branch flow path 226 having the shape shown in FIG. 13, but the branch flow path 226 may have a different shape if the flow rate detection unit 260 and the two outlet portions 240 can be connected. For example, as shown in FIG. 36, the branch flow paths 226A has a curved wall surface in a region where the detection flow path 224 branches. Further, for example, the branch flow paths 226B has a wall surface having a sharp shape in the region where the detection flow path 224 branches. Further, the number of outlet portions 240 included in the flow rate measurement device 400 according to the second embodiment is not limited to two. For example, three or more outlet portions 240 may be provided. In this case, the flow rate measurement device 400 may have three or more branch flow paths 226 so that the three or more outlet portions 240 and the flow rate detection unit 260 can be connected. Further, for example, the number of outlet portion 240 may be one. In this case, as shown in FIG. 38, the detection flow path 224 may have a flow path structure having no branch flow path.

C6. Sixth Other Embodiment

In the above embodiment, the discharge port 250 may be provided on the wall surface of the housings 210 and 410 where the pressure is smaller than the pressure of the surface facing the flow direction at the time of backflow. The discharge port 250 may be provided on, for example, a surface of the housings 210 and 410 facing the flow direction, for example, a tip surface.

C7. Seventh Other Embodiment

In the above embodiments, the flow rate measurement devices 200 and 400 may have different flow path structures. For example, the number of outlet portions 240 may be three or more. Further, for example, the number of the inlet portions 230 may be two or more. Further, for example, the flow rate measurement device 200 may not include the discharge port 250.

C8. Eighth Other Embodiment

In the above embodiments, the flow rate measurement devices 200 and 400 are used in the combustion system 10, but may be used other than the combustion system 10. For example, the flow rate measurement device 200 may be attached to an air supply pipe of an air supply system in a fuel cell system that uses air as an oxidant gas.

C9. Ninth Other Embodiment

In the above embodiments, the flow rate measurement devices 200 and 400 have a structure for reducing the flow path cross-sectional area of the detection flow path 224, for example, the convex portion 228. However, the flow rate measurement devices 200 and 400 may not have a structure for reducing the flow path cross-sectional area of the detection flow path 224.

According to the first to fifth other embodiments described above, the same effect is obtained in that the configuration is the same as that of the above embodiment.

The present disclosure should not be limited to the embodiments described above, and various other embodiments may be implemented without departing from the scope of the present disclosure. For example, the technical features in the present embodiment corresponding to the technical features in the aspect described in the summary may be replaced or combined as appropriate in order to solve a part or all of the above-described issues, or to achieve a part or all of the above-described effects. Also, if the technical features are not described as essential in the present specification, they can be deleted as appropriate.

What is claimed is:

1. A flow rate measurement device that is attached to a main flow path in a state of being inserted into the main flow path through which a fluid to be measured flows, and measures a flow rate of the fluid to be measured in the main flow path, the flow rate measurement device comprising:
a housing having a side surface extending in an insertion direction of the flow rate measurement device into the main flow path;
a sub flow path formed inside the housing and through which a part of the fluid to be measured flows through the main flow path;
an inlet portion provided on the side surface and configured to flow the fluid to be measured flowing in the main flow path into the sub flow path;
an outlet portion that causes the fluid to be measured flowing in the sub flow path to flow out to the main flow path;
a flow rate detection unit provided between the inlet portion and the outlet portion in the sub flow path and configured to detect the flow rate of the fluid to be measured flowing in the sub flow path; and
a communication hole provided between the flow rate detection unit and the outlet portion in the sub flow path and configured to communicate the sub flow path and the main flow path; wherein
in a flow path of the sub flow path between the flow rate detection unit and the outlet portion, which is provided with the communication hole, a flow path cross-sectional area of the sub flow path in at least a part between the flow rate detection unit and the communication hole is smaller than the flow path cross-sectional area of the sub flow path between the communication hole and the outlet portion.

2. The flow rate measurement device according to claim 1, further comprising:
a discharge port provided between the inlet portion and the flow rate detection unit in the sub flow path and configured to communicate the sub flow path and the main flow path.

3. The flow rate measurement device according to claim 1, wherein
the communication hole is provided in a wall surface of the housing where a pressure is smaller than a pressure of a facing surface, when in the main flow path the fluid to be measured flows from the facing surface facing a side surface where the inlet portion is provided.

4. The flow rate measurement device according to claim 3, wherein
a wall surface provided with the communication hole is a wall surface provided with the inlet portion.

5. The flow rate measurement device according to claim 1, wherein
the sub flow path has a stepped portion between the flow rate detection unit and the communication hole so as to reduce the cross-sectional area of the flow path.

6. The flow rate measurement device according to claim 5, wherein
the stepped portion is provided at a position adjacent to an opening of the communication hole.

7. The flow rate measurement device according to claim 1, wherein
when viewed from the outlet portion side, at least a part of the opening of the communication hole overlaps with the opening of the outlet portion.

8. The flow rate measurement device according to claim 3, wherein
a plurality of the outlet portions are provided,
the plurality of outlet portions are provided on a wall surface of the housing whose pressure is smaller than the pressure of the facing surfaces of the housing when the fluid to be measured flows from the inlet portion side in the main flow path, and the sub flow path has a branch flow path that branches between the flow rate detection unit and the plurality of outlet portions and communicates the plurality of outlet portions with the communication hole.

\* \* \* \* \*